US011873894B2

(12) United States Patent
Fukuda et al.

(10) Patent No.: US 11,873,894 B2
(45) Date of Patent: Jan. 16, 2024

(54) WORKING MACHINE

(71) Applicant: KUBOTA CORPORATION, Osaka (JP)

(72) Inventors: Yuji Fukuda, Osaka (JP); Jun Tomita, Osaka (JP); Yuya Konishi, Osaka (JP); Fumitaka Fujisawa, Osaka (JP); Daiki Abe, Osaka (JP); Kohei Kurachi, Osaka (JP); Yudai Koga, Osaka (JP); Yuya Tanabe, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 65 days.

(21) Appl. No.: 17/397,168

(22) Filed: Aug. 9, 2021

(65) Prior Publication Data

US 2022/0049727 A1 Feb. 17, 2022

(30) Foreign Application Priority Data

Aug. 15, 2020 (JP) .................................. 2020-137183
Oct. 12, 2020 (JP) .................................. 2020-171638

(51) Int. Cl.
*F16H 61/47* (2010.01)
*F16H 61/431* (2010.01)
(Continued)

(52) U.S. Cl.
CPC ........... *F16H 61/47* (2013.01); *E02F 9/2235* (2013.01); *E02F 9/2253* (2013.01);
(Continued)

(58) Field of Classification Search
CPC ..... E02F 9/2296; E02F 9/2292; E02F 9/2289; E02F 9/2285; E02F 9/2282; E02F 9/2253;
(Continued)

(56) References Cited

U.S. PATENT DOCUMENTS 3,807,174 A * 4/1974 Wagenseil ............ F16H 61/456
60/420
4,395,878 A * 8/1983 Morita .................. B60W 30/18
60/427

(Continued)

FOREIGN PATENT DOCUMENTS

JP 2018-084334 A 5/2018
JP 2020-008171 A 1/2020

*Primary Examiner* — Dustin T Nguyen
(74) *Attorney, Agent, or Firm* — Greenblum & Bernstein, P.L.C.

(57) ABSTRACT

A working machine includes a first traveling fluid passage connected to a first pressure-receiving portion, a second traveling fluid passage connected to a second pressure-receiving portion, a third traveling fluid passage connected to a third pressure-receiving portion, a fourth traveling fluid passage fluidly connected to a fourth pressure-receiving portion, and a connection fluid passage connecting at least two of the first, second, third and fourth pressure-receiving portions to each other. When a traveling operation member is operated, operation fluid flows to the first pressure receiving portion through the first traveling fluid passage, to the second pressure receiving portion through the second traveling fluid passage, to the third pressure receiving portion through the third traveling fluid passage, and to the fourth pressure receiving portion through the fourth traveling fluid passage.

6 Claims, 12 Drawing Sheets

(51) Int. Cl.
*E02F 9/22* (2006.01)
*F15B 11/17* (2006.01)
*F16H 61/456* (2010.01)
*F16H 61/438* (2010.01)
*E02F 3/34* (2006.01)

(52) U.S. Cl.
CPC .......... *E02F 9/2282* (2013.01); *E02F 9/2285* (2013.01); *E02F 9/2289* (2013.01); *E02F 9/2292* (2013.01); *E02F 9/2296* (2013.01); *F15B 11/17* (2013.01); *F16H 61/431* (2013.01); *B60Y 2400/85* (2013.01); *E02F 3/3414* (2013.01); *E02F 9/2228* (2013.01); *F15B 2211/20576* (2013.01); *F15B 2211/6355* (2013.01); *F15B 2211/7135* (2013.01); *F16H 61/438* (2013.01); *F16H 61/456* (2013.01)

(58) Field of Classification Search
CPC ..... E02F 9/2235; E02F 9/2228; E02F 3/3414; F16H 61/456; F16H 61/438; F16H 61/431; B60T 2400/85; F15B 2211/7135; F15B 2211/6355; F15B 2211/20576
See application file for complete search history.

(56) References Cited

U.S. PATENT DOCUMENTS

| | | | | |
|---|---|---|---|---|
| 4,631,920 | A * | 12/1986 | Seelman | B62D 11/04 60/486 |
| 5,746,056 | A * | 5/1998 | Smith | F16H 61/423 60/449 |
| 6,374,605 | B1 * | 4/2002 | Dvorak | F16D 31/02 60/452 |
| 2010/0236233 | A1 * | 9/2010 | Sumiyoshi | E02F 9/2232 60/468 |
| 2017/0159679 | A1 * | 6/2017 | Fukuda | F16H 61/44 |

* cited by examiner

WORKING MACHINE

BACKGROUND OF THE INVENTION

1. Field of the Invention

The present invention relates to a working machine such as a skid steer loader, a compact track loader, or a backhoe.

2. Description of the Related Art

A working machine disclosed in Japanese Unexamined Patent Publication No. 2020-8171 is known as including a traveling operation device, an HST pump, and a traveling fluid passage connecting the traveling operation device to the HST pump.

A working machine disclosed in Japanese Unexamined Patent Publication No. 2018-84334 is known as a technique for improving responsiveness of hydraulic equipment in changing an opening degree of an actuation value. A hydraulic system for the working machine of Japanese Unexamined Patent Publication No. 2018-84334 includes a hydraulic pump configured to deliver operation fluid, a first fluid passage connected to the hydraulic pump, an operating valve disposed on the first fluid passage and configured to change a pressure of the operation fluid output therefrom according to an operation of an operation member, a hydraulic device configured to be operated by the operation fluid output from the operation valve, a second fluid passage connecting the operation valve to the hydraulic device, an actuation valve disposed on the first fluid passage between the operation valve and the hydraulic pump, a third fluid passage connecting the second fluid passage to a section of the first fluid passage between the operation valve and the actuation valve, a check valve disposed on the third fluid passage to allow operation fluid to flow from the second fluid passage to the first fluid passage and to prevent the operation fluid flowing from the first fluid passage to the second fluid passage, a hydraulic pump configured to deliver operation fluid, a hydraulic switching valve configured to be shifted to a plurality of switching positions according to a pressure of the operation fluid, and a traveling hydraulic device configured to change an operation speed according to the switching positions of the hydraulic switching valve.

SUMMARY OF THE INVENTION

In the working machine disclosed in Japanese Unexamined Patent Publication No. 2020-8171 mentioned above, traveling operations such as straight traveling, spin turn, and pivot turn can be performed by operating the traveling operation device to change a pilot pressure of pilot fluid in the traveling fluid passage. In the Japanese Unexamined Patent Publication No. 2020-8171, a high-pressure selector valve is disposed on the traveling fluid passage, so that the traveling operation can be performed smoothly; however, there is a demand for a smoother traveling operation.

In the working machine disclosed in Japanese Unexamined Patent Publication No. 2018-84334, when an opening degree of the actuation valve is changed, the operation fluid in the first fluid passage can be discharged to the actuation valve side through the third fluid passage connecting the second fluid passage to the section of the first fluid passage between the operation valve and the actuation valve. Although Japanese Unexamined Patent Publication No. 2020-8171 can improve responsiveness of hydraulic equipment in changing the opening degree of the actuation value, it is desired to further improve the responsiveness.

In view of the problems of the above-mentioned conventional technique, a working machine benefiting by improved operability of traveling operations is desired.

In addition, a working machine benefiting by improved responsiveness of left and right traveling pumps for normal rotation of the traveling hydraulic device during actuation of the actuation valve is desired.

In an aspect, a working machine includes a machine body, a left traveling device provided on a left portion of the machine body, a right traveling device provided on a right portion of the machine body, a left traveling motor configured to output power to the left traveling device, a right traveling motor configured to output power to the right traveling device, a left traveling pump, including a first pressure-receiving portion and a second pressure-receiving portion, configured to normally rotate the left traveling motor when operation fluid is applied to the first pressure-receiving portion, and reversely rotate the left traveling motor when operation fluid is applied to the second pressure-receiving portion, a right traveling pump, including a third pressure-receiving portion and a fourth pressure-receiving portion, configured to normally rotate the right traveling motor when operation fluid is applied to the third pressure-receiving portion, and reversely rotate the right traveling motor when operation fluid is applied to the fourth pressure-receiving portion, a traveling operation device configured to apply the operation fluid to at least any one of the first, second, third and fourth pressure-receiving portions according to operation of a traveling operation member, a first traveling fluid passage fluidly connected to the first pressure-receiving portion and configured so that the operation fluid to be applied to the first pressure-receiving portion flows through the first traveling fluid passage when the traveling operation member is operated, a second traveling fluid passage fluidly connected to the second pressure-receiving portion and configured so that the operation fluid to be applied to the second pressure-receiving portion flows through the second traveling fluid passage when the traveling operation member is operated, a third traveling fluid passage fluidly connected to the third pressure-receiving portion and configured so that the operation fluid to be applied to the third pressure-receiving portion flows through the third traveling fluid passage when the traveling operation member is operated, a fourth traveling fluid passage fluidly connected to the fourth pressure-receiving portion and configured so that the operation fluid to be applied to the fourth pressure-receiving portion flows through the fourth traveling fluid passage when the traveling operation member is operated, and a connection fluid passage fluidly connecting at least two of the first, second, third and fourth pressure-receiving portions to each other.

The connection fluid passage fluidly connects either one of the first and third traveling fluid passages and either one of the second and fourth traveling fluid passages to each other.

The connection fluid passage includes a first connection passage that fluidly connects the first traveling fluid passage and the fourth traveling fluid passage to each other, and a second connection passage that fluidly connects the second traveling fluid passage and the third traveling fluid passage to each other.

The working machine further includes an actuation valve configured to supply operation fluid to the traveling operation device, and change a pressure of the operation fluid supplied therefrom to the traveling operation device, and a first fluid passage fluidly connecting the traveling operation device to the actuation valve.

The working machine further includes a second fluid passage fluidly connecting the first and third traveling fluid passages to the first fluid passage.

The working machine further includes a restrictor provided on the connection fluid passage.

In another aspect, a working machine includes a machine body, a left traveling device provided on a left portion of the machine body, a right traveling device provided on a right portion of the machine body, a left traveling motor configured to output power to the left traveling device, a right traveling motor configured to output power to the right traveling device, a left traveling pump, including a first pressure-receiving portion and a second pressure-receiving portion, configured to normally rotate the left traveling motor when operation fluid is applied to the first pressure-receiving portion, and reversely rotate the left traveling motor when operation fluid is applied to the second pressure-receiving portion, a right traveling pump, including a third pressure-receiving portion and a fourth pressure-receiving portion, configured to normally rotate the right traveling motor when operation fluid is applied to the third pressure-receiving portion, and reversely rotate the right traveling motor when operation fluid is applied to the fourth pressure-receiving portion, a traveling operation device configured to apply the operation fluid to at least any one of the first, second, third and fourth pressure-receiving portions according to operation of a traveling operation member, an actuation valve configured to supply operation fluid to the traveling operation device, and change a pressure of the operation fluid supplied therefrom to the traveling operation device, a first fluid passage fluidly connecting the traveling operation device to the actuation valve, a first traveling fluid passage fluidly connected to the first pressure-receiving portion and configured so that the operation fluid to be applied to the first pressure-receiving portion flows through the first traveling fluid passage when the traveling operation member is operated, a second traveling fluid passage fluidly connected to the second pressure-receiving portion and configured so that the operation fluid to be applied to the second pressure-receiving portion flows through the second traveling fluid passage when the traveling operation member is operated, a third traveling fluid passage fluidly connected to the third pressure-receiving portion and configured so that the operation fluid to be applied to the third pressure-receiving portion flows through the third traveling fluid passage when the traveling operation member is operated, a fourth traveling fluid passage fluidly connected to the fourth pressure-receiving portion and configured so that the operation fluid to be applied to the fourth pressure-receiving portion flows through the fourth traveling fluid passage when the traveling operation member is operated, a second fluid passage fluidly connecting the first fluid passage to the first traveling fluid passage, and a third fluid passage fluidly connecting the first fluid passage to the third traveling fluid passage.

The working machine further includes a first check valve provided on the second fluid passage and configured to allow the operation fluid to flow from the first traveling fluid passage to the first fluid passage, and prevent the operation fluid from flowing from the first fluid passage to the first traveling fluid passage, and a second check valve provided on the third fluid passage and configured to allow the operation fluid to flow from the third traveling fluid passage to the first fluid passage, and prevent the operation fluid from flowing from the first fluid passage to the third traveling fluid passage.

The working machine further includes a first restrictor provided on the first traveling fluid passage and on an opposite side of a first joint between the first traveling fluid passage and the second fluid passage from the left traveling pump, and a second restrictor provided on the third traveling fluid passage and on an opposite side of a second joint between the third traveling fluid passage and the second fluid passage from the right traveling pump.

The working machine includes a drainage configured to drain the operation fluid, a fourth fluid passage fluidly connecting the drainage to the second traveling fluid passage, and a fifth fluid passage fluidly connecting the drainage to the fourth traveling fluid passage.

The working machine further includes a third check valve provided on the fourth fluid passage and configured to prevent the operation fluid from flowing from the first traveling fluid passage to the drainage, and allow the operation fluid to flow from the drainage to the first traveling fluid passage, and a fourth check valve provided on the fifth fluid passage and configured to prevent the operation fluid from flowing from the third traveling fluid passage to the drainage, and prevent the operation fluid from flowing from the drainage to the third traveling fluid passage.

The working machine mentioned above further includes a third restrictor provided on the first traveling fluid passage and on an opposite side of a third joint between the first traveling fluid passage and the fourth fluid passage from the left traveling pump, and a fourth restrictor provided on the third traveling fluid passage and on an opposite side of a fourth joint between the third traveling fluid passage and the fourth fluid passage from the right traveling pump.

According to the working machine, operability in a traveling operation can be improved.

In addition, according to the above-mentioned working device, responsiveness of left and right traveling pumps for normal rotation of the traveling hydraulic device during actuation of the actuation valve can be improved.

DETAILED DESCRIPTION OF THE PREFERRED EMBODIMENTS

A preferred embodiment of a hydraulic system for a working machine and the working machine having the hydraulic system will be described below with reference to drawings.

First Embodiment

Figure 10:
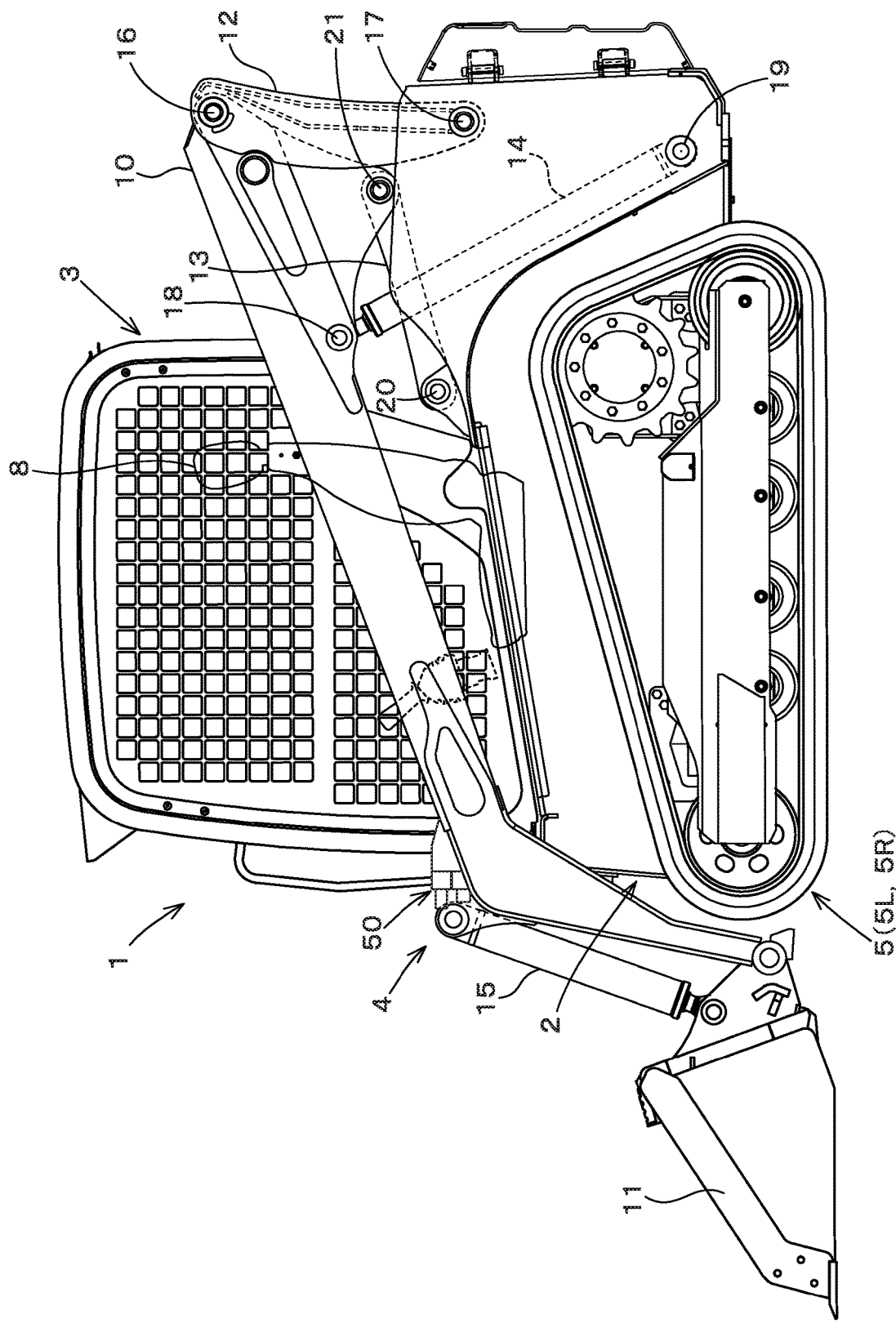
FIG. 10 is a side view showing a track loader that is an example of the working machine.

FIG. 10 is a side view of a working machine according to an embodiment of the present invention. FIG. 10 shows a compact track loader as an example of the working machine. However, the working machine according to the embodiment of the present invention is not limited to the compact track loader. The working machine may be another typed loader, such as a skid steer loader. The working machine may be any other than loaders.

As shown in FIG. 10, the working machine 1 includes a machine body 2, a cabin 3, a working device 4, and traveling devices 5. In the embodiment of the present invention, a forward direction from an operator siting on an operator's seat 8 of the working machine 1 (a left side in FIG. 10) is referred to as the front, a rearward direction from the driver (a right side in FIG. 10) is referred to as the rear, a leftward direction from the driver (a front surface side of FIG. 10) is referred to as the left, and a rightward direction from the driver (a back surface side of FIG. 10) is referred to as the right. A horizontal direction orthogonal to a fore-and-aft direction is referred to as a machine width direction. A direction extending from a center portion of the machine body 2 to the right or left is described as a machine outward direction. In other words, the machine outward direction is equivalent to the machine width direction and separates away from the machine body 2. A direction opposite to the machine outward direction is described as a machine inward direction. In other words, the machine inward direction is equivalent to the machine width direction and approaches the machine body 2.

The cabin 3 is mounted on the machine body 2. The cabin 3 incorporates a driver seat 8. The working device 4 is attached to the machine body 2. The traveling devices 5 are arranged on the outside of the machine body 2. A prime mover 32 is mounted on a rear portion of the machine body 2.

The working device 4 includes booms 10, a working tool (for example, a bucket) 11, lift links 12, control links 13, boom cylinders 14, and bucket cylinders 15.

The booms 10 are arranged on right and left sides of the cabin 3 swingably up and down. The working tool is a bucket 11, for example. The bucket 11 is arranged at tip portions (front end portions) of the booms 10 swingably up and down. The lift links 12 and the control links 13 support base portions (rear portions) of the booms 10 so that the booms 10 can be swung up and down. The boom cylinders 14 are extended and contracted to lift and lower the booms 10. The bucket cylinders 15 are extended and contracted to swing the bucket 11.

Front portions of the right and left booms 10 are connected to each other by a deformed connecting pipe. Base portions (rear portions) of the booms 10 are connected to each other by a circular connecting pipe.

The lift links 12, control links 13, and boom cylinders 14 are respectively arranged on right and left sides of the machine body 2 to correspond to the right and left booms 10.

The lift links 12 are disposed vertically from rear portions of the base portions of the booms 10. Upper portions (one ends) of the lift links 12 are pivotally supported on the rear portion of the base portions of the booms 10 via respective pivot shafts 16 (first pivot shafts) rotatably around their lateral axes. Lower portions (the other ends) of the lift links 12 are pivotally supported on a rear portion of the machine body 2 via respective pivot shafts 17 (second pivot shafts) rotatably around their lateral axes. The second pivot shafts 17 are disposed below the first pivot shafts 16.

Upper portions of the boom cylinders 14 are pivotally supported via respective pivot shafts 18 (third pivot shafts) rotatably around their lateral axes. The third pivot shafts 18 are disposed at the base portions of the booms 10, especially, at front portions of the base portions. Lower portions of the boom cylinders 14 are pivotally supported via respective pivot shafts 19 (fourth pivot shafts) rotatably around their lateral axes. The fourth pivot shafts 19 are disposed closer to a lower portion of the rear portion of the machine body 2 and below the third pivot shafts 18.

The control links 13 are disposed in front of the lift links 12. One ends of the control links 13 are pivotally supported via respective pivot shafts 20 (fifth pivot shafts) rotatably around their lateral axes. The pivot shafts 20 are disposed on the machine body 2 forward of the lift links 12. The other ends of the control links 13 are pivotally supported via respective pivot shafts 21 (sixth pivot shafts) rotatably around their lateral axes. The sixth pivot shafts 21 are disposed on the booms 10 forwardly upward from the second pivot shafts 17.

By extending and contracting the boom cylinders 14, the booms 10 are swung up and down around the first pivot shafts 16 with the base portions of the booms 10 being supported by the lift links 12 and the control links 13, thereby lifting and lowering the tip end portions of the booms 10. The control links 13 are swung up and down around the fifth pivot shafts 20 according to the vertical swinging of the booms 10. The lift links 12 are swung back and forth around the second pivot shafts 17 according to the vertical swinging of the control links 13.

An alternative working tool instead of the bucket 11 can be attached to the front portions of the booms 10. The alternative working tool is, for example, an attachment (auxiliary attachment) such as a hydraulic crusher, a hydraulic breaker, an angle broom, an earth auger, a pallet fork, a sweeper, a mower or a snow blower.

A connecting member 50 is disposed at the front portion of the left boom 10. The connecting member 50 is a device configured to connect a hydraulic equipment attached to the auxiliary attachment to a first piping member such as a pipe disposed on the left boom 10. Specifically, the first piping member can be connected to one end of the connecting member 50, and a second piping member connected to the hydraulic equipment of the auxiliary attachment can be connected to the other end. In this manner, an operation fluid flowing in the first piping member passes through the second piping member and then is supplied to the hydraulic equipment.

The bucket cylinders 15 are arranged respectively closer to the front portions of the booms 10. The bucket cylinders 15 are extended and contracted to swing the bucket 11.

A crawler type (including semi-crawler type) traveling device is adopted to each of the traveling devices 5 (first traveling device 5L and second traveling device 5R) disposed on the left and right portions. Alternatively, a wheel-type traveling device having front wheels and rear wheels may be adopted.

The prime mover 32 is an internal combustion engine such as a diesel engine or a gasoline engine, an electric motor, or the like. In the embodiment, the prime mover 32 is the diesel engine, but is not limited thereto.

Next, a traveling hydraulic system for the working machine will be described.

Figure 1:
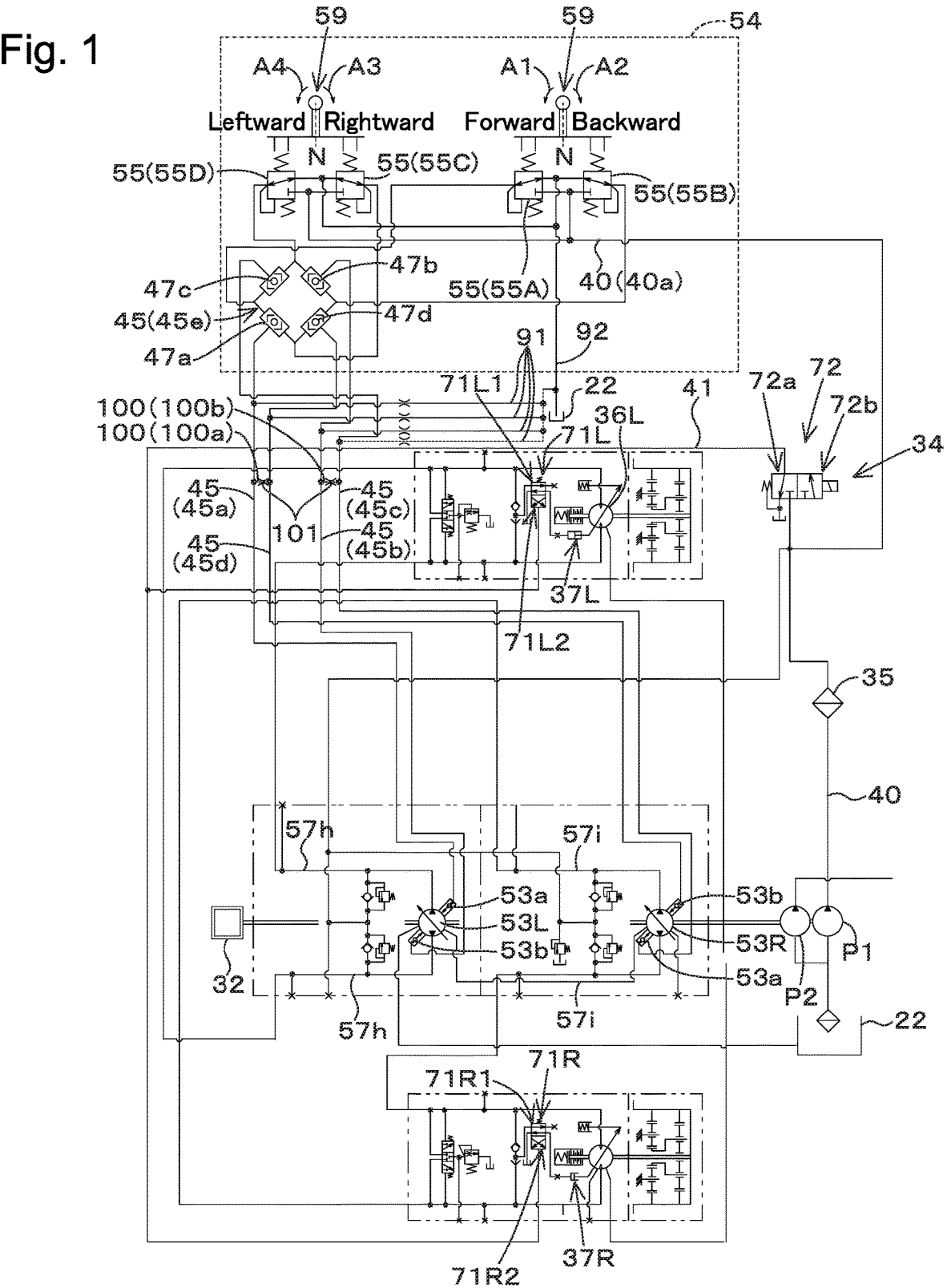
FIG. 1 is a view showing a traveling hydraulic system (hydraulic circuit) for a working machine according to a first embodiment.

As shown in FIG. 1, the hydraulic system for the working machine includes a first hydraulic pump P1 and a second hydraulic pump P2. The first hydraulic pump P1 is a pump to be driven by a power of the prime mover 32 and is constituted of a constant displacement type gear pump. The first hydraulic pump P1 is configured to deliver the operation fluid stored in the tank 22. Specifically, the first hydraulic pump P1 delivers operation fluid that is mainly used for control. For convenience of explanation, the tank 22 that stores the operation fluid may be referred to as an operation fluid tank. Of the operation fluid delivered from the first hydraulic pump P1, the operation fluid to be used for control may be referred to as a pilot fluid, and a pressure of the pilot fluid may be referred to as a pilot pressure.

The second hydraulic pump P2 is a pump to be driven by a power of the prime mover 32, and is constituted of a constant displacement gear pump. The second hydraulic pump P2 is configured to deliver the operation fluid stored in the tank 22 and, for example, delivers the operation fluid to the fluid passages of the working system. For example, the second hydraulic pump P2 delivers the operation fluid to control valves (flowrate control valves) that control the boom cylinders 14 that move the booms 10, the bucket cylinder 15 that operates the bucket, and an auxiliary hydraulic actuator that operates the auxiliary attachment.

The hydraulic system for the working machine includes a pair of traveling motors 36L and 36R and a pair of traveling pumps 53L and 53R. The pair of traveling motors 36L and 36R are motors that output powers to the pair of traveling devices 5 (first traveling device 5L and second traveling device 5R). The traveling motor 36L, serving as one of the pair of traveling motors 36L and 36R, outputs a rotational power to the first traveling device (left traveling device) 5L, and the traveling motor 36R, serving as the other of the pair of traveling motors 36L and 36R, outputs a rotational power to the second traveling device (right traveling device) 5R.

The pair of traveling pumps 53L and 53R are pumps to be driven by the powers of the prime mover 32 and are, for example, variable displacement axial pumps with swash plates. The pair of traveling pumps 53L and 53R are driven to deliver the operation fluid to of the respective traveling motors 36L and 36R. The traveling pump 53L, serving as one of the pair of traveling pumps 53L and 53R, delivers the operation fluid to the traveling pump 53L, and the traveling pump 53R, serving as the other of the pair of traveling pumps 53L and 53R, delivers the operation fluid to the traveling pump 53R.

For convenience of explanation, the traveling pump 53L may be referred to as a left traveling pump 53L, the traveling pump 53R may be referred to as a right traveling pump 53R, the traveling motor 36L may be referred to as a left traveling motor 36L, and the traveling motor 36R may be referred to as a right traveling motor 36R.

Each of the left traveling pump 53L and the right traveling pump 53R includes a pressure-receiving portion 53a and a pressure-receiving portion 53b to which pressures (pilot pressures) of the operation fluid (pilot fluid) from the first hydraulic pump P1 are applied. Angles of the swash plates are changed by the pilot pressure applied to the pressure-receiving portions 53a and 53b. By changing the angles of the swash plates, the outputs (delivery rates of operation fluid) of the left traveling pump 53L and the right traveling pump 53R can be changed, and delivery directions of the operation fluid also can be changed.

The left traveling pump 53L and the left traveling motor 36L are connected by a connection fluid passage 57h, so that the operation fluid delivered by the left traveling pump 53L is supplied to the left traveling motor 36L. The right traveling pump 53R and the right traveling motor 36R are connected by a connection fluid passage 57i, so that the operation fluid delivered by the right traveling pump 53R is supplied to the right traveling motor 36R.

The left traveling motor 36L is configured to be rotated by the operation fluid delivered from the left traveling pump 53L, and a rotation speed (number of rotations) can be changed according to a flowrate of the operation fluid. A swash plate switching cylinder 37L is connected to the left traveling motor 36L, and thus the rotation speed (number of rotations) of the left traveling motor 36L can be changed by extending or contracting the swash plate switching cylinder 37L in one direction or the other direction. That is, when the swash plate switching cylinder 37L is contracted, the rotation speed of the left traveling motor 36L is set to a low speed stage (first speed), and when the swash plate switching cylinder 37L is extended, the rotation speed of the left traveling motor 36L is set to a high speed stage (second speed). That is, the rotation speed of the left traveling motor 36L can be shifted between the first speed which is the low speed stage and the second speed which is the high speed stage.

The right traveling motor 36R is configured to be rotated by the operation fluid delivered from the right traveling pump 53R, and a rotation speed (number of rotations) can be changed according to a flowrate of the operation fluid. A swash plate switching cylinder 37R is connected to the right traveling motor 36R, and thus the rotation speed (number of rotations) of the right traveling motor 36R can be changed by extending or contracting the swash plate switching cylinder 37R in one direction or the other direction. That is, when the swash plate switching cylinder 37R is contracted, the rotation speed of the right traveling motor 36R is set to a low speed stage (first speed), and when the swash plate switching cylinder 37R is extended, the rotation speed of the right traveling motor 36R can be shifted between the first speed which is the low speed stage and the second speed which is the high speed stage.

As shown in FIG. 1, the hydraulic system for the working device includes a traveling switching valve 34. The traveling switching valve 34 is configured to be shifted to either a first state where a rotation speed (number of rotations) of each of the traveling motors (left traveling motor 36L and right traveling motor 36R) is set to a first speed or a second state where the rotation speed of each traveling motor is set to a second speed. The traveling switching valve 34 includes first switching valves 71L and 71R and a second switching valve 72.

The first switching valve 71L is constituted of a two-position switching valve connected via a fluid passage to the swash plate switching cylinder 37L of the left traveling motor 36L, and is shiftable between two positions, a first position 71L1 and a second position 71L2. The first switching valve 71L, when set at the first position 71L1, contracts the swash plate switching cylinder 37L. The first switching valve 71L, when set at the second position 71L2, extends the swash plate switching cylinder 37L.

The first switching valve 71R is constituted of a two-position switching valve connected via a fluid passage to the swash plate switching cylinder 37R of the right traveling motor 36R, and is shiftable between two positions, a first position 71R1 and a second position 71R2. The first switching valve 71R, when set at the first position 71R1, contracts the swash plate switching cylinder 37R. The first switching valve 71R, when set at the second position 71R2, extends the swash plate switching cylinder 37R.

The second switching valve 72 is a solenoid valve that shifts the first switching valve 71L and the first switching valve 71R, and is constituted of a two-position switching valve shiftable between two positions, a first position 72a and a second position 72b. The second switching valve 72, the first switching valve 71L and the first switching valve 71R are connected by a fluid passage 41. The second switching valve 72, when set at the first position 72a, shifts the first switching valves 71L and 71R to the respective first positions 71L1 and 71R1. The second switching valve 72, when set at the second position 72b, shifts the first switching valves 71L and 71R to the respective second positions 71L2 and 71R2.

That is, when the second switching valve 72 is in the first position 72a, the first switching valve 71L is in the first position 71L1, and the first switching valve 71R is in the first position 71R1, the traveling switching valve 34 enters the first state so that the rotation speed of each of the traveling motors (left traveling motor 36L and right traveling motor 36R) is set to the first speed. When the second switching valve 72 is in the second position 72b, the first switching valve 71L is in the second position 71L2, and the first switching valve 71R is in the second position 71R2, the traveling switching valve 34 enters the second state so that the rotation speed of each of the traveling motors (left traveling motor 36L and right traveling motor 36R) is set to the second speed.

Accordingly, the traveling switching valve 34 is configured to shift the traveling motors (left traveling motor 36L and right traveling motor 36R) between the first speed which is the low speed stage and the second speed which is the high speed stage.

The traveling operation device (operation device) 54 is configured to apply, when the traveling operation member 59 is operated, the operation fluid to the pressure-receiving portions 53a and 53b of the traveling pumps (left traveling pump 53L and right traveling pump 53R) so as to change the angles (swash plate angles) of the swash plates of the traveling pumps. The traveling operation device 54 includes the traveling operating member 59 and a plurality of operating valves 55.

The traveling operation member 59 is an operation lever that is supported on the operation valves 55 and swings in a lateral direction (the machine width direction) or the fore-and-aft direction. That is, relative to a neutral position N, the traveling operation member 59 is operable to the right and to the left from the neutral position N, and operable to the front and to the rear from the neutral position N. In other words, the operation member 59 is swingable in at least four directions from the neutral position N. For convenience of explanation, the forward and backward directions, that is, the fore-and-aft direction, may be referred to as a first direction. The rightward and leftward directions, that is, the lateral direction (the machine width direction), may be referred to as a second direction.

The plurality of operating valves 55 are operated by a common, i.e., single, traveling operating member 59. The plurality of operating valves 55 are actuated according to swinging of the traveling operating member 59. A delivery fluid passage 40 is connected to the plurality of operating valves 55, and the operation fluid (pilot fluid) delivered from the first hydraulic pump P1 can be supplied through the delivery fluid passage 40. The plurality of operating valves 55 include an operation valve 55A, an operation valve 55B, an operation valve 55C, and an operation valve 55D.

When the traveling operation member 59 is swung forward (in one of the fore-and-aft directions (first direction)) (when a forward operation is performed), the operation valve 55A changes a pressure of operation fluid output therefrom according to an operation amount (operation) in the forward operation. When the traveling operating member 59 is swung backward (in the other direction of the fore-and-aft directions (first direction)) (when a backward operation is performed), the operation valve 55B changes a pressure of operation fluid output therefrom according to an operation amount (operation) in the backward operation. When the traveling operation member 59 is swung rightward (in one direction of the opposite lateral directions (second direction)) (when a rightward operation is performed), the operation valve 55C changes a pressure of operation fluid output therefrom according to an operation amount (operation) in the rightward operation. When the traveling operation member 59 is swung leftward (in the other direction of the opposite lateral directions (second direction)) (in a leftward operation), the operation valve 55D changes a pressure of operation fluid output therefrom according to an operation amount (operation) in the leftward operation.

The plurality of operating valves 55 are connected to the traveling pumps (left and right traveling pumps 53L and 53R) by traveling fluid passages 45. In other words, the traveling pumps (left and right traveling pumps 53L and 53R) are hydraulic devices that can be operated by the operation fluid output from the operation valves 55 (operation valves 55A, 55B, 55C, and 55D).

The traveling fluid passages 45 include a first traveling fluid passage 45a, a second traveling fluid passage 45b, a third traveling fluid passage 45c, a fourth traveling fluid passage 45d, and a fifth traveling fluid passage 45e. The first traveling fluid passage 45a is connected to the pressure-receiving portion (first pressure-receiving portion) 53a of the left traveling pump 53L so as to supply operation fluid applied to the pressure-receiving portion (first pressure-receiving portion) 53a according to operation of the traveling operation member 59. The second traveling fluid passage 45b is connected to the pressure-receiving portion (second pressure-receiving portion) 53b of the left traveling pump 53L so as to supply operation fluid applied to the pressure-receiving portion (second pressure-receiving portion) 53b according to operation of the traveling operation member 59. The third traveling fluid passage 45c is connected to the pressure-receiving portion (third pressure-receiving portion) 53a of the right traveling pump 53R so as to supply operation fluid applied to the pressure-receiving portion (third pressure-receiving portion) 53a according to operation of the traveling operation member 59. The fourth traveling fluid passage 45d is connected to the pressure-receiving portion (fourth pressure-receiving portion) 53b of the right traveling pump 53R so as to supply a fluid passage through which operation fluid applied to the pressure-receiving portion (fourth pressure-receiving portion) 53b according to operation of the traveling operation member 59. The fifth traveling fluid passage 45e connects the operation valve 55, the first traveling fluid passage 45a, the second traveling fluid passage 45b, the third traveling fluid passage 45c, and the fourth traveling fluid passage 45d to each other. A plurality of high-pressure selector valves 47a, 47b, 47c, and 47d are disposed on the fifth traveling fluid passage 45e. The plurality of high-pressure selector valves 47a, 47b, 47c, and 47d are connected to the first traveling fluid passage 45a, the second traveling fluid passage 45b, the third traveling fluid passage 45c, and the fourth traveling fluid passage 45d, respectively, so as to allow operation fluid having higher pressure (pilot pressure) to flow to the corresponding traveling fluid passage.

A drain fluid passage 91, which drains the operation fluid, is connected to each of the first traveling fluid passage 45a, the second traveling fluid passage 45b, the third traveling fluid passage 45c, and the fourth traveling fluid passage 45d. A restrictor is disposed on the drain fluid passage 91. The drain fluid passage 91 is merged with the drain fluid passage 92 connected to the drain ports of the operation valves 55 (operation valve 55A, operation valve 55B, operation valve 55C and operation valve 55D). The drain fluid passage 92 is connected to a drainage such as the operation fluid tank 22.

When the traveling operating member 59 is swung forward (in a direction of arrowed line A1 in FIG. 1), the operation valve 55A is operated to output a pilot pressure therefrom. This pilot pressure is applied to the pressure-receiving portion 53a of the left traveling pump 53L via the first traveling fluid passage 45a and to the pressure-receiving portion 53a of the right traveling pump 53R via the third traveling fluid passage 45c. In this manner, the swash plate angles of the left traveling pump 53L and the right traveling pump 53R are changed so that the left traveling motor 36L and the right traveling motor 36R normally rotate (forward rotation), and the working machine 1 travels straight forward.

When the traveling operating member 59 is swung backward (in a direction of arrowed line A2 in FIG. 1), the operation valve 55B is operated to output a pilot pressure therefrom. This pilot pressure is applied to the pressure-receiving portion 53b of the left traveling pump 53L via the second traveling fluid passage 45b and to the pressure-receiving portion 53b of the right traveling pump 53R via the fourth traveling fluid passage 45d. In this manner, the swash plate angles of the left traveling pump 53L and the right traveling pump 53R are changed so that the left traveling motor 36L and the right traveling motor 36R reversely rotate (backward rotation), and the working machine 1 travels straight backward.

When the traveling operating member 59 is swung rightward (in a direction of arrowed line A3 in FIG. 1), the operation valve 55C is operated to output a pilot pressure therefrom. This pilot pressure is applied to the pressure-receiving portion 53a of the left traveling pump 53L via the first traveling fluid passage 45a and to the pressure-receiving portion 53b of the right traveling pump 53R via the fourth traveling fluid passage 45d. In this manner, the swash plate angles of the left traveling pump 53L and the right traveling pump 53R are changed so that the left traveling motor 36L normally rotates, and the right traveling motor 36R reversely rotates, thereby causing the working machine 1 to spin-turn to the right.

In addition. when the traveling operating member 59 is swung leftward (in a direction of arrowed line A4 in FIG. 1), the operation valve 55D is operated to output a pilot pressure therefrom. This pilot pressure is applied to the pressure-receiving portion 53a of the right traveling pump 53R via the third traveling fluid passage 45c and to the pressure-receiving portion 53b of the left traveling pump 53L via the second traveling fluid passage 45b. In this manner, the swash plate angles of the left traveling pump 53L and the right traveling pump 53R are changed so that the left traveling motor 36L reversely rotates, and the right traveling motor 36R normally rotates, thereby causing the working machine 1 to spin-turn to the left.

In addition, when the traveling operation member 59 is swung in an oblique direction, rotational directions and rotational speeds of the left traveling motor 36L and the right traveling motor 36R are determined by a differential pressure of the pilot pressures applied to the pressure-receiving portion 53a and the pressure-receiving portion 53b, so that the working machine 1 pivotally turns to the right or to the left while traveling forward or backward.

That is, when the traveling operation member 59 is operated to be swung diagonally forward to the left, the working machine 1 turns left while traveling forward at a speed corresponding to a swing angle of the traveling operation member 59. When the traveling operation member 59 is operated to be swung diagonally forward to the right, the working machine 1 turns right while traveling forward at a speed corresponding to a swing angle of the traveling operation member 59. When the traveling operation member 59 is operated to be swung diagonally backward to the left, the working machine 1 turns left while traveling backward at a speed corresponding to a swing angle of the traveling operation member 59. When the traveling operation member 59 is operated to be swung diagonally backward to the right, the working machine 1 turns right while traveling backward at a speed corresponding to a swing angle of the traveling operation member 59.

Next, a working hydraulic system will be described.

Figure 2:
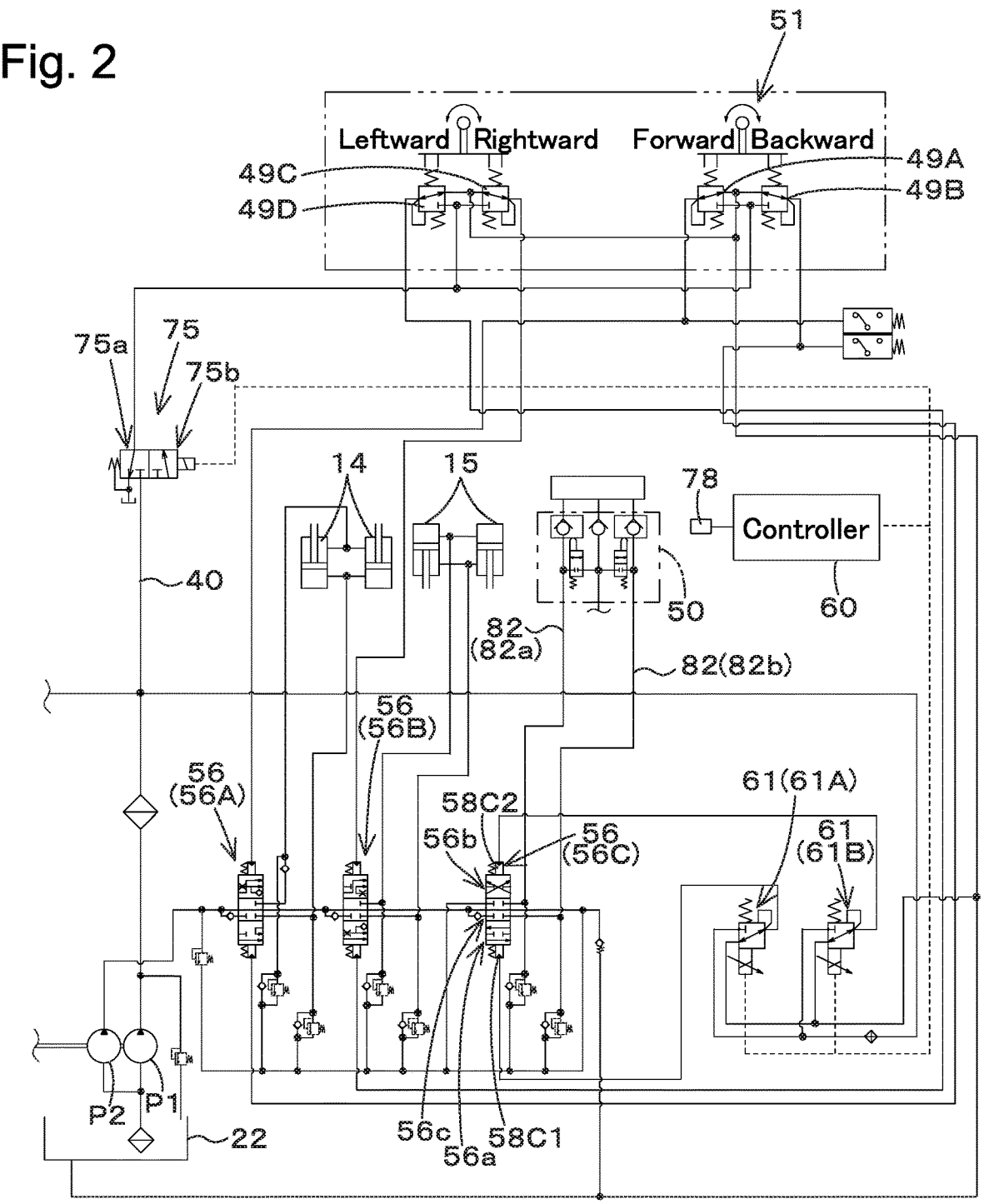
FIG. 2 is a view showing a working hydraulic system (hydraulic circuit) for the working machine according to the first embodiment.

As shown in FIG. 2, a plurality of control valves 56 are connected to the second hydraulic pump P2 via a fluid passage. The plurality of control valves 56 include a boom control valve 56A, a bucket control valve 56B, and an auxiliary control valve 56C. The boom control valve 56A is a pilot-operated three-position switching valve having a direct-acting spool and controls the boom cylinder 14. The bucket control valve 56B is a pilot-operated three-position switching valve having a direct-acting spool and controls the bucket cylinder 15. The auxiliary control valve 56C is a pilot-operated three-position switching valve having a direct-acting spool and controls a hydraulic actuator of the auxiliary attachment. The auxiliary control valve 56C can be shifted among the first position 56a, the second position 56b, and the third position 56c by the pilot pressure. The third position 56C is the neutral position.

The boom 10 and bucket 11 can be operated by the operation member 51 disposed around the driver's seat 8. The operation member 51 is supported tiltably from the neutral position in the fore-and-aft direction, the width direction orthogonal to the fore-and-aft direction, and the diagonal directions. By tilt-operation of the operation member 51, the operation valves 49A, 49B, 49C, and 49D disposed at a lower portion of the operation member 51 can be operated.

When the operation member 51 is tilted to the front, the operation valve 49A is operated to output a pilot pressure therefrom. This pilot pressure is applied to the pressure-receiving portions of the boom control valve 56A, and the operation fluid entering the boom control valve 56A is supplied to a rod side chamber of the boom cylinder 14, thereby lowering the booms (boom 10L and boom 10R).

When the operation member 51 is tilted to the rear, the operation valve 49B is operated to output a pilot pressure therefrom. This pilot pressure is applied to the pressure-receiving portions of the boom control valve 56A, and the operation fluid entering the boom control valve 56A is supplied to a bottom side chamber of the boom cylinder 14, thereby raising the booms.

That is, the boom control valve 56A is capable of controlling a flowrate of operation fluid flowing to the boom cylinder 14 in accordance with a pressure of the operation fluid determined according to the operation of the operation member 51 (the pilot pressure defined by the operation valve 49A and the pilot pressure defined by the operation valve 49B).

When the operation member 51 is tilted to the right, the operation valve 49C is operated, and the pilot fluid is applied to the pressure-receiving portions of the bucket control valve 56B. As a result, the bucket control valve 56B is operated in a direction to extend the bucket cylinder 15, and accordingly the bucket 11 performs a dumping movement at a speed proportional to a tilting amount of the operation member 51.

When the operation member 51 is tilted to the left, the operation valve 49D is operated, and the pilot fluid is applied to the pressure-receiving portions of the bucket control valve 56B. As a result, the bucket control valve 56B is operated in a direction to contract the bucket cylinder 15, and accordingly the bucket 11 performs a scooping movement at a speed proportional to the tilting amount of the operation member 51.

That is, the bucket control valve 56B is capable of controlling a flowrate of the operation fluid flowing in the bucket cylinder 15 in accordance with a pressure of the operation fluid determined according to operation of the operation member 51 (the pilot pressures defined by the operation valves 49C and 49D). That is, the operation valves 49A, 49B, 49C, and 49D change a pressure of the operation fluid according to the operation of the operation member 51 and supply the operation fluid with the changed pressure to the boom control valve 56A and the bucket control valve 56B.

At least one supply/discharge fluid passage 82 is connected to the auxiliary control valve 56C. The at least one supply/discharge fluid passage 82 includes a fluid passage 82a connected to one of the two ports of the auxiliary control valve 56C and a fluid passage 82b connected to the other port. The supply/discharge fluid passages 82 (fluid passages 82a and 82b) are connected to the connecting member 50 so as to fluidly connect the hydraulic actuator of the auxiliary attachment to the connecting member 50. Accordingly, the operation fluid can be supplied from the auxiliary control valve 56C to the hydraulic actuator of the auxiliary attachment. The auxiliary control valve 56C is operated by at least one proportional valve 61 whose opening degree can be changed according to a pressure of the operation fluid. The at least one proportional valve 61 includes a first proportional valve 61A which is connected via a fluid passage to the pressure-receiving portion 58C1 of the auxiliary control valve 56C, and a second proportional valve 61B which is connected via a fluid passage to the pressure-receiving portion 58C2 of the auxiliary control valve 56C. When the first proportional valve 61A is opened, the pilot fluid is applied to the pressure-receiving portion 58C1 through the fluid passage. In addition, when the second proportional valve 61B is opened, the pilot fluid is applied to the pressure-receiving portion 58C2 via the fluid passage.

Accordingly, when the pilot fluid is applied to the pressure-receiving portion 58C1 or 58C2 of the auxiliary control valve 56C, the auxiliary control valve 56C is shifted so that the hydraulic actuator of the auxiliary attachment is actuated by the operation fluid supplied from the auxiliary control valve 56C. The working machine 1 includes a controller 60. The first proportional valve 61A and the second proportional valve 61B are operated by the controller 60. The controller 60 performs various controls of the working machine 1, and is constituted of a semiconductor such as a CPU or a MPU, electrical/electronic circuits, or the like. An operation member 78 disposed around the driver's seat 8 is connected to the controller 60. The operation member 78 is constituted of, for example, a swingable seesaw-type switch, a slidable switch, or a push-type switch that can be pressed. An operation amount of the operation member 78 is input to the controller 60. The controller 60 outputs a control signal (e.g., electric current) corresponding to the operation amount of the operation member 78 to the first proportional valve 61A or the second proportional valve 61B. The proportional valves 61 (first proportional valve 61A and second proportional valve 61B) are opened and closed according to the control signal output from the controller 60. Accordingly, when the operation fluid output to the proportional valves 61 (first proportional valve 61A and second proportional valve 61B) reaches a predetermined pressure level, the auxiliary control valve 56C is shifted to any one of the first position 56a, the second position 56b, and the third position 56c to operate the hydraulic attachment.

As shown in FIG. 2, a hydraulic lock valve 75 is disposed on the delivery fluid passage 40 connecting the first hydraulic pump P1 to the control valves 49A, 49B, 49C, and 49D. The hydraulic lock valve 75 is a two-position switching valve shiftable between a first position 75a and a second position 75b. When the hydraulic lock valve 75 is at the first position 75a, supply of operation fluid to the operation valves 49A, 49B, 49C, and 49D is blocked. When the hydraulic lock valve 75 is at the second position 75b, the supply of operation fluid to the operation valves 49A, 49B, 49C, and 49D is allowed.

As shown in FIG. 1, the hydraulic system for the working machine includes connection fluid passages 100. Each of the connection fluid passages 100 is a fluid passage that connects at least two of the first traveling fluid passages 45a, the second traveling fluid passage 45b, the third traveling fluid passage 45c, and the fourth traveling fluid passage 45d to each other.

Each of the connection fluid passage 100 connects the traveling fluid passages 45 so as to connect the pressure-receiving portion (first pressure-receiving portion or third pressure-receiving portion) 53a of each of the left and right traveling pumps 53L and 53R on the side for the normal rotation of each of the left and right traveling motors 36L and 36R and the pressure-receiving portion (second pressure-receiving portion or fourth pressure-receiving portion) 53b of each of the left and right traveling pumps 53L and 53R on the side for the reverse rotation of each of the left and right traveling motors 36L and 36R to each other. That is, the connection fluid passage 100 connects either one of the first and third traveling fluid passages 45a and 45c and either one of the second and fourth traveling fluid passages 45b and 45d to each other. In more detail, the connection fluid passage 100 includes a first connection passage 100a connecting the first traveling fluid passage 45a and the fourth traveling fluid passage 45d to each other, and a second connection passage 100b connecting the second traveling fluid passage 45b and the third traveling fluid passage 45c to each other. The connection fluid passage 100 includes a restrictor 101. In detail, both the first connection passage 100a and the second connection passage 100b include respective restrictors 101.

Second Embodiment

Figure 3:
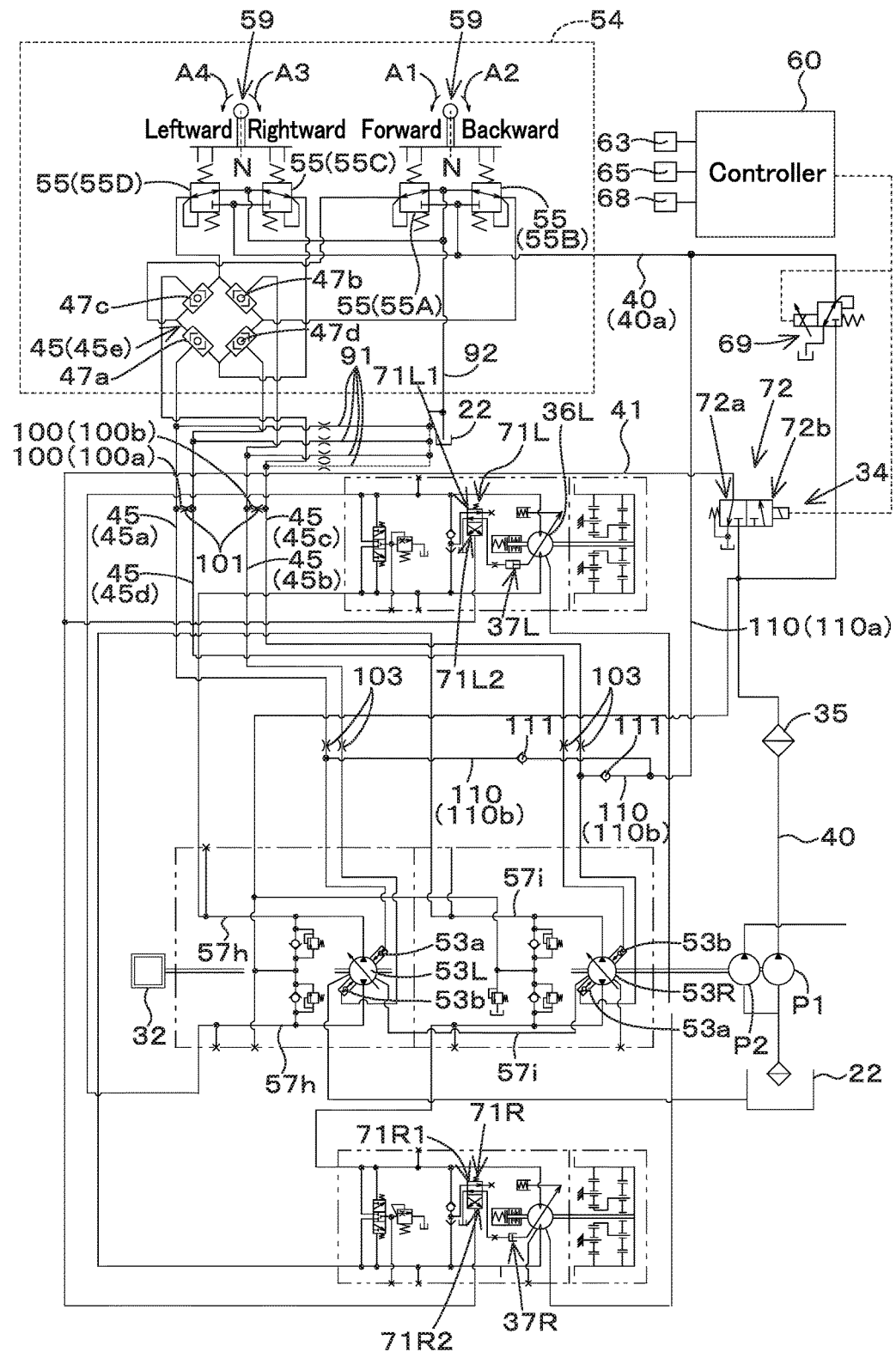
FIG. 3 is a view showing a traveling hydraulic system (hydraulic circuit) for a working machine according to a second embodiment.

FIG. 3 shows a hydraulic system for a working machine according to a second embodiment.

As shown in FIG. 3, the hydraulic system for the working machine includes an actuation valve 69.

The actuation valve 69 is a valve that can change the pilot pressure of the pilot fluid operating the traveling pumps (left and right traveling pumps 53L and 53R). The actuation valve 69 and the traveling operation device 54 are connected by the first fluid passage 40a. In detail, the actuation valve 69 is disposed on an intermediate portion of the delivery fluid passage 40, and a section in the delivery fluid passage 40 that connects the actuation valve 69 to the traveling operation device 54 is the first fluid passage 40a.

The actuation valve 69 changes the opening degree thereof to change the pilot pressure (operation pilot pressures applied to the pressure-receiving portions 53a and 53b) of the pilot fluid that operates the traveling pumps (left and right traveling pumps 53L and 53R). For example, the actuation valve 69 is an electromagnetic proportional valve whose opening degree can be changed based on the control signal (e.g., voltage, electric current) of the controller 60. The actuation valve 69 is configured so that an opening degree thereof increases as a value of the control signal (control value) increases, and the opening degree decreases as the control value decreases.

Now, the controller 60 performs a control to prevent the engine stalling (anti-stall control) by controlling the actuation valve 69 when a heavy load is applied on the prime mover 32. That is, the controller 60 performs the anti-stall control according to a load on the prime mover 32.

For example, when a dropping amount, which is a difference between the target rotation speed defined by the accelerator 65 and the actual rotation speed detected by the rotation detection device 68, is not less than a threshold value, the controller 60 performs the anti-stall control because it means that a heavy load is applied on the prime mover 32. In the anti-stall control, the outputs of the traveling pumps (left and right traveling pumps 53L and 53R) are reduced by reducing the opening degree of the actuation valve 69 shown in FIG. 3. That is, the controller 60 outputs the control signal to the actuation valve 69 to magnetize a solenoid of the valve 69, thereby changing the pilot pressure (traveling primary pressure) applied from the valve 69 toward the traveling control unit 54. In this manner, the pilot pressure to operate the traveling pumps (left and right traveling pumps 53L and 53R) are changed.

Figure 4:
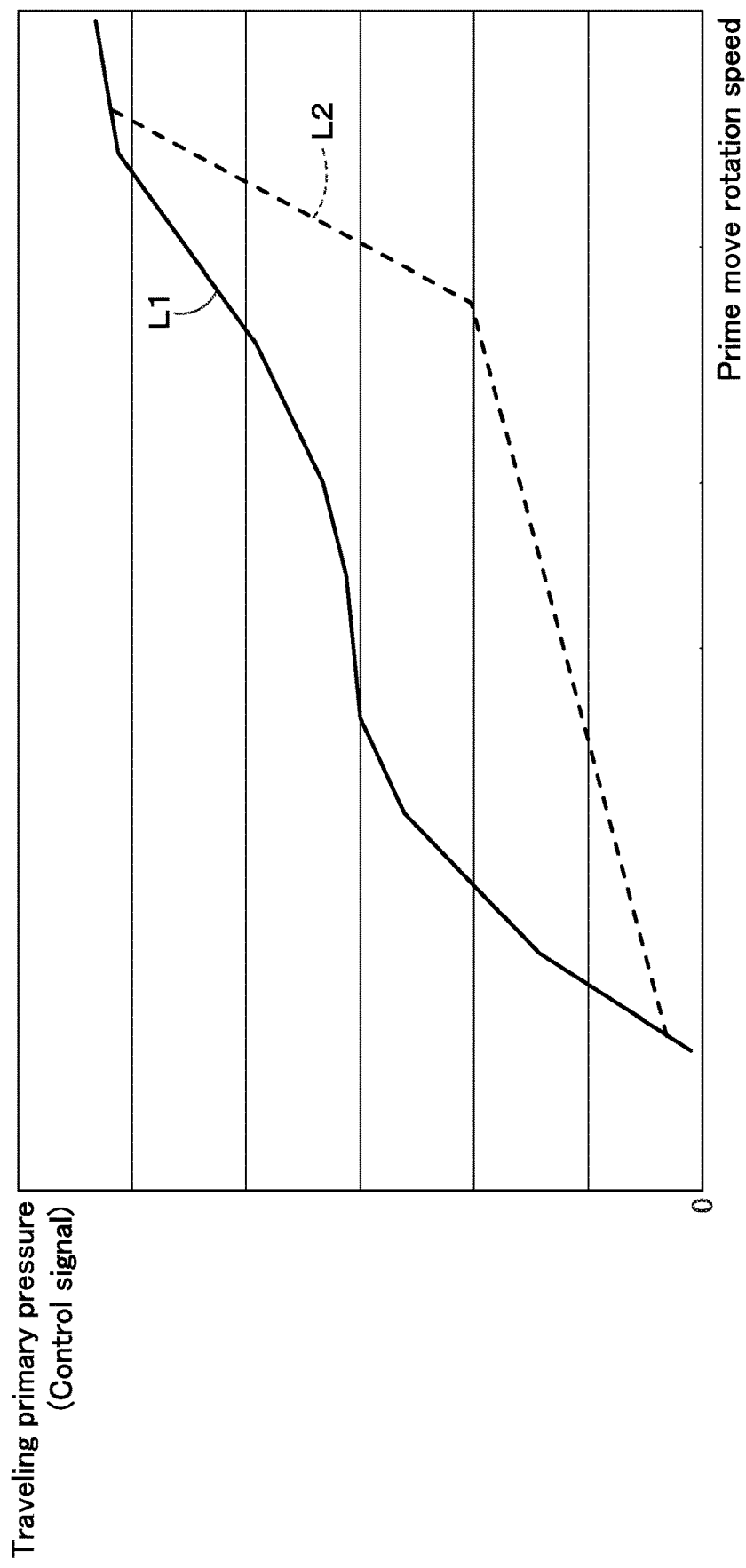
FIG. 4 is a view showing a relationship between a traveling primary pressure (control signal) and a rotation speed of a prime mover.

FIG. 4 shows an example of a control map showing a relationship between the traveling primary pressure and the rotation speed of the prime mover in the anti-stall. In the control map shown in FIG. 4, since the traveling primary pressure is determined corresponding to the opening degree of the actuation valve 69, there is a correlation between the traveling primary pressure and a magnitude of the control signal to be output to the actuation valve 69, and thus the traveling primary pressure can be replaced by the control signal. That is, the traveling primary pressure on a vertical axis of the control map can be read as the control signal. The control map is stored in the storage unit 63.

The controller 60 calculates the dropping amount, which is a difference between the target rotation speed determined by the accelerator 65 and the actual rotation speed detected by the rotation detection device 68. When the dropping amount is less than a threshold value, the controller 60 determines a control value indicated by the control signal according to the rotation speed of the prime mover (target rotation speed or actual rotation speed) so as to match a line L1 of the control map.

On the other hand, when the dropping amount is not less than the threshold value, the controller 60 determines the control value indicated by the control signal according to the rotation speed of the prime mover (target rotation speed or actual rotation speed) so as to match a line L2 of the control map. That is, the controller 60 determines the control value such as the current value or the voltage value based on the control map.

Accordingly, in the anti-stall control, the pilot pressure (traveling primary pressure) of the operation fluid entering the operation valves 55 can be kept low by determining the control value based on the line L2 and outputting the control signal indicating the control value to the operation valve 69. As a result, the swash plate angles of the traveling pumps (left and right traveling pumps 53L and 53R) are adjusted, a load applied to the prime mover 32 is reduced, thereby preventing the engine stalling. In FIG. 4, a single of the single line L2 is shown, but the line L2 may be multiplied.

As shown in FIG. 3, the first fluid passage 40a includes a second fluid passage 110. The second fluid passage 110 connects at least the first traveling fluid passage 45a and the third traveling fluid passage 45c to the first fluid passage 40a.

The second fluid passage 110 includes a first connection passage 110a and a second connection passage 110b. The first connection passage 110a is connected to the first fluid passage 40a and extends toward the first traveling fluid passage 45a and the third traveling fluid passage 45c. The second connection passage 110b branches from the first connection passage 110a and is connected to the first traveling fluid passage 45a and the third traveling fluid passage 45c.

A check valve 111 is disposed on an intermediate portion of the first connection passage 110a. The check valve 111 is configured to allow the operation fluid to flow from the first traveling fluid passage 45a and the third traveling fluid passage 45c toward the first fluid passage 40a and prevents the operation fluid from flowing from the first fluid passage 40a toward the first traveling fluid passage 45a and the third traveling fluid passage 45c. As shown in FIG. 3, each of the traveling fluid passages 45 (first traveling fluid passage 45a, second traveling fluid passage 45b, third traveling fluid passage 45c, and fourth traveling fluid passage 45d) includes a restrictor 103.

Figure 5A:
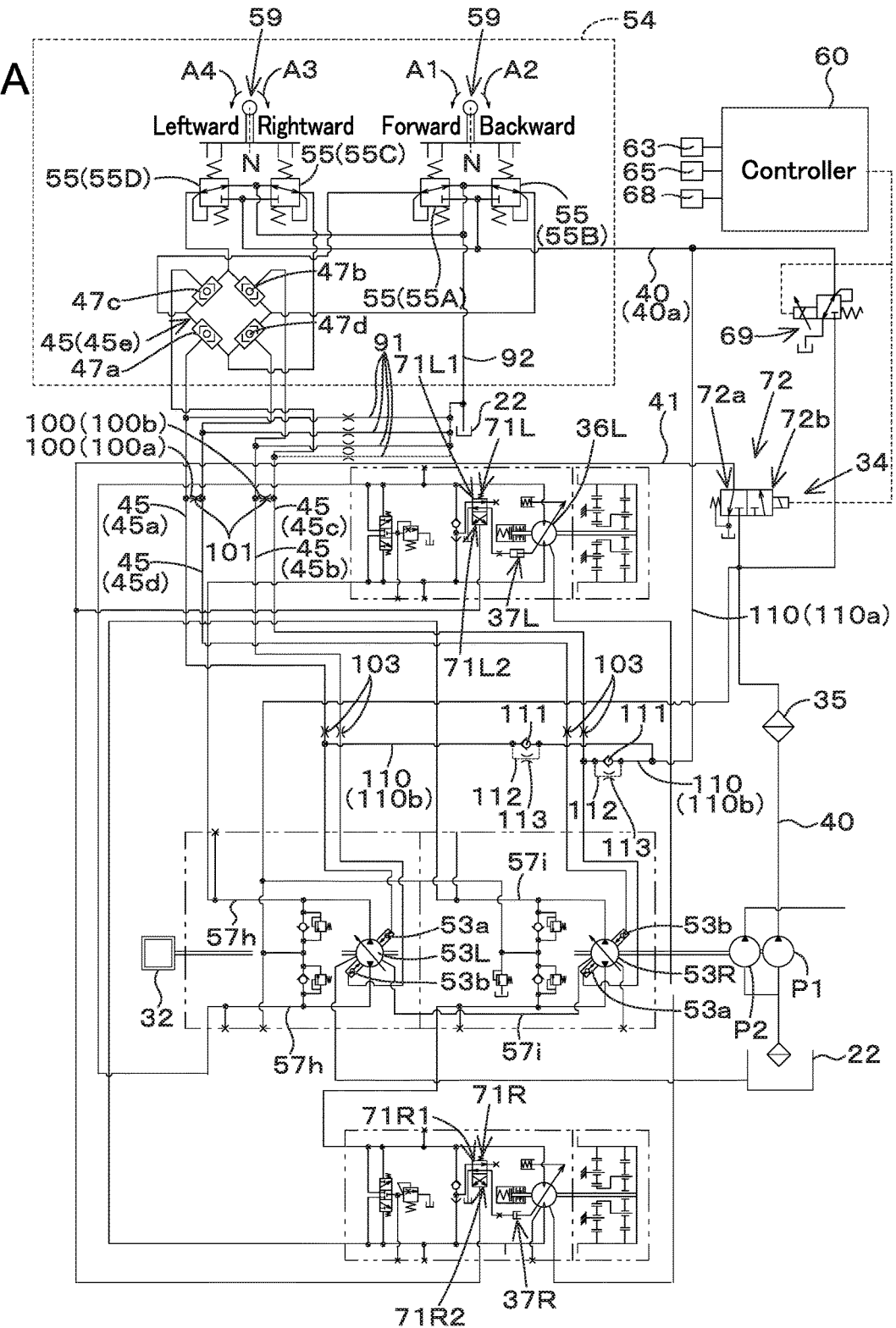
FIG. 5A is a view showing a modified example of a connection fluid passage.
Figure 5B:
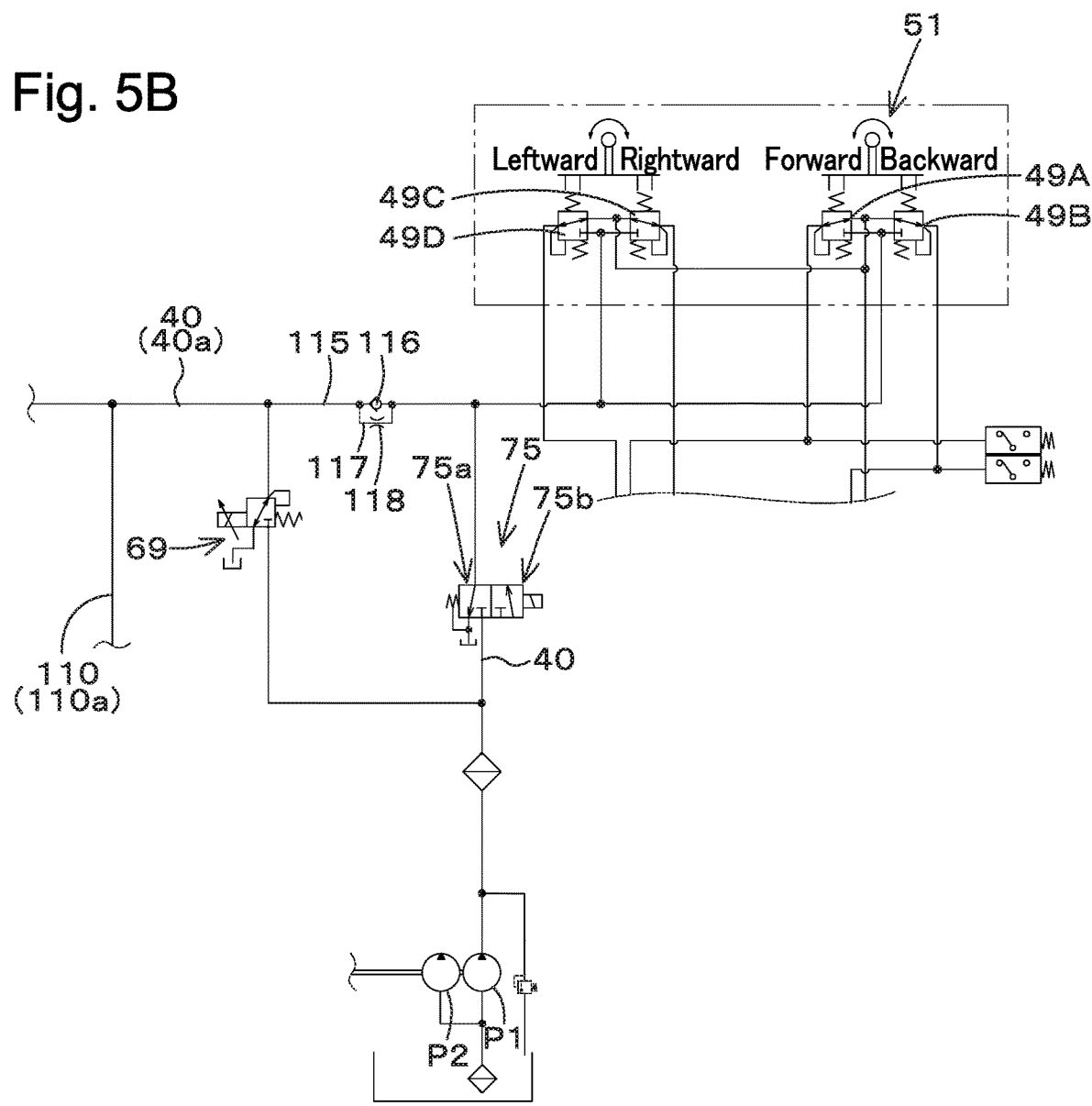
FIG. 5B is a view showing a modified example of a connection fluid passage other than that of FIG. 5A.

Alternatively, as shown in FIG. 5A, the second connection passage 110b may include a fluid passage 112 connecting both end portions of the check valve 111 to each other, and the fluid passage 112 may include a restrictor 113. Alternatively, as shown in FIG. 5B, the delivery fluid passage 40 may include a fluid passage 115 connecting the actuation valve 69 to the hydraulic lock valve 75, a check valve 116 may be disposed on the fluid passage 115, a fluid passage 117 connecting both side portions of the check valve 116 to each other may be disposed, and the fluid passage 117 may include a restrictor 118.

In the above-described embodiment, as shown in FIGS. 3 and 5A, on each of the traveling fluid passages 45 (first traveling fluid passage 45a, second traveling fluid passage 45b, third traveling fluid passage 45c, and fourth traveling fluid passage 45d), the restrictor 103 is disposed downstream of the connection fluid passage 100. Alternatively, the restrictor 103 may be disposed upstream of the connection fluid passage 100, that is, between the connection fluid passage 100 and the high-pressure selector valves (47a to 47d).

Third Embodiment

Figure 6:
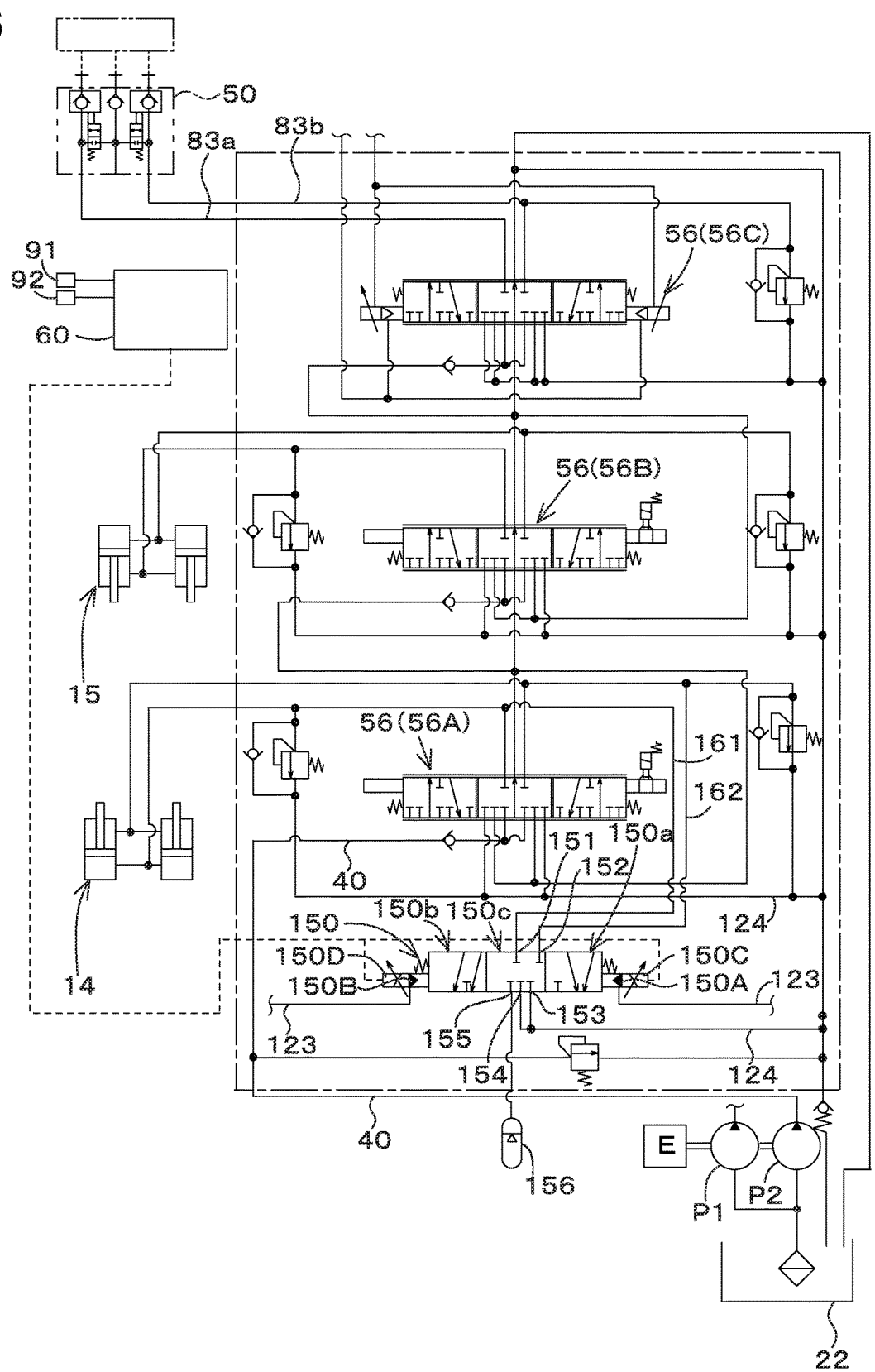
FIG. 6 is a view showing a working hydraulic system (hydraulic circuit) for the working machine according to the third embodiment.

FIG. 6 shows a hydraulic system for a working machine according to a third embodiment. The hydraulic system for the working machine of FIG. 6 includes a switching valve (operation switching valve) 150 shiftable between a state to perform an anti-vibration operation and a state to perform a floating operation. The switching valve 150 is a three-position switching valve that can be shifted to any one of a first position 150a, a second position 150b, and a neutral position 150c. The switching valve 150 when at the first position 150a performs the floating operation. The switching valve 150 when at the second position 150b performs the anti-vibration operation. The switching valve 150 when a the neutral position 150c stops the anti-vibration operation and the floating operation.

The switching valve 150 will be described in detail below.

The switching valve 150 includes a first port 151, a second port 152, a third port 153, a fourth port 154, and a fifth port 155. A first connection passage 161 is connected to the first port 151. A second connection passage 162 is connected to the second port 152. The third port 153 and the fourth port 154 are connected to the draining fluid passage 124 connected to the operation fluid tank 22. An accumulator 156, which is a pressure storage device, is connected to the fifth port 155.

In addition, the switching valve 150 is a pilot-operated switching valve incorporating a solenoid valve (electromagnetic proportional valve), and includes a pressure-receiving portion 150A that receives a pressure of operation fluid (pilot fluid), a pressure-receiving portion 150B that receives a pressure of pilot fluid, a first solenoid 150C, and a second solenoid 150D. The pressure-receiving portion 150A is located on one longitudinal end portion of the spool, and the pressure-receiving portion 150B is located on the other longitudinal end portion of the spool. A fluid passage (pilot-supplying passage) 123 connected to the first hydraulic pump P1 is connected to the pressure-receiving portion 150A and the pressure-receiving portion 150B so as to supply the operation fluid (pilot fluid) to the pressure-receiving portion 150A and the pressure-receiving portion 150B.

When the first solenoid 150C is magnetized, the pilot pressure received by the pressure-receiving portion 150A is applied to the spool, and the switching valve 150 is shifted to the first position 150a along with movement of the spool in one direction. When the second solenoid 150D is magnetized, the pilot pressure received by the pressure-receiving portion 150B is applied to the spool, and the switching valve 150 is shifted to the second position 150b along with movement of the spool in the other direction. When either the first solenoid 150C or the second solenoid 150D is demagnetized, the spool stays at the neutral position to set the switching valve 150 at the neutral position 150c.

When the switching valve 150 is at the first position 150a, the spool fluidly connects the first port 151 to the fourth port 154. In this manner, the operation fluid in the first fluid chamber 14f of the boom cylinder 14 is drained to the draining fluid passage 124 through the first connection passage 161, the first port 151, and the fourth port 154. In addition, when the switching valve 150 is shifted to the first position 150a, the second port 152 and the third port 153 are fluidly connected to each other by the spool. In this manner, the operation fluid in the second fluid chamber 14g of the boom cylinder 14 is drained to the draining fluid passage 124 through the second connection passage 162, the second port 152 and the third port 153. That is, when the switching valve 150 is at the first position 150a, the first and second connecting passages 161 and 162 are fluidly connected to the draining fluid passage 124 by the spool, and the operation fluid of the boom cylinder 14 can be drained to the draining fluid passage 124, thereby enabling the floating operation.

In addition, when the switching valve 150 is shifted to the second position 150b, the first port 151 and the fifth port 155 are fluidly connected to each other by the spool. This causes the boom cylinder 14 to be connected to the accumulator 156 through the first connection passage 161, the first port 151 and the fifth port 155. In addition, when the switching valve 150 is shifted to the second position 150b, the second port 152 and the third port 153 are connected by the spool, and the operation fluid of the boom cylinder 14 is drained to the draining fluid passage 124 through the second connection passage 162, the second port 152, and the third port 153. That is, when the switching valve 150 is at the second position 150b, the first connection passage 161 is connected to the accumulator 156, and the second connection passage 162 is connected to the draining fluid passage 124 by the spool, thereby enabling the anti-vibration operation. In this manner, even when the bucket 11 vibrates up and down during the working machine 1 is traveling, the accumulator 156 can absorb the pressure fluctuation in the first fluid chamber 14f of the boom cylinder 14, and accordingly the traveling vibration of the working machine 1 can be suppressed.

The switching control of the switching valve 150 is performed by the controller 60. A first switch 191 and a second switch 192 are connected to the controller 60. The first switch 191 and the second switch 192 are disposed in the vicinity of the driver's seat 8. An operator seated on the driver's seat 8 can operate the first switch 191 and the second switch 192.

The first switch 191 is an on/off switch configured so that, when the first switch 191 is turned on, the first switch 191 outputs a first command for the floating operation to the controller 60. The first switch 191 does not output the first command to the controller 60 when the first switch 191 is turned off. When the controller 60 obtains the first command from the first switch 191, the controller 60 outputs a control signal to the first solenoid 150C of the switching valve 150 to magnetize the first solenoid 150C. In addition, in a state where the controller 60 does not obtain the first command from the first switch 191 (when turned off), the controller 60 outputs the control signal to the first solenoid 150C of the switching valve 150 to demagnetize the first solenoid 150C.

The second switch 192 is an on/off switch configured so that, when the second switch 192 is turned on, the second switch 192 outputs a second command for the anti-vibration operation to the controller 60. The second switch 192 does not output the second command to the controller 60 when the second switch 192 is turned off. When the controller 60 obtains the second command from the second switch 192, the controller 60 outputs a control signal to the second solenoid 150D of the switching valve 150 to magnetize the second solenoid 150D. In addition, in a state where the controller 60 does not obtain the second command from the second switch 192 (when turned off), the controller 60 outputs the control signal to the second solenoid 150D of the switching valve 150 to demagnetize the second solenoid 150D.

When the second switch 192 is turned on to perform the anti-vibration operation and the first switch having been turned off is turned on, the controller 60 stops the anti-vibration operation performed by turning on the second switch 192. That is, when the first switch 191 is turned on and the first command is input to the controller 60 while the second solenoid 150D is magnetized according to the second command (the switching valve 150 is in the second position 150b), the controller 60 gives priority to the first command over the second command, and thus demagnetizes the second solenoid 150D even when the second switch 192 is turned on, and further magnetizes the first solenoid 150C to shift the switching valve 150 to the first position 150a.

According to the controller 60, while the controller 60 is configured to allow easy switching between the floating operation and the anti-vibration operation with the first switch 191 and the second switch 192, the floating operation can be given priority when both the floating operation and the anti-vibration operation are instructed, and accordingly working by the working machine 1 can be performed efficiently.

Since the switching valve (operation switching valve) 150 is configured to switch the operation between the anti-vibration operation and the floating operation, the switching valve 150 can reduce an amount of operation fluid drained from the switching valve in comparison with a case where a switching valve for switching the anti-vibration operation and a switching valve for switching the floating operation are separately configured in a hydraulic circuit and both switching valves are operated simultaneously in the hydraulic circuit.

In the hydraulic circuit in which the switching valve for switching the anti-vibration operation and the switching valve for switching the floating operation are separately configured, there are both leakage from the switching valve generated when the anti-vibration operation is stopped and leakage from the other switching valve generated when the floating operation is stopped, and the amount of leakage is a summed amount of the leakages from both of the switching valves (total amount of leakages). On the other hand, since the switching valve (operation switching valve) 150 is a single valve that switches the operation between the anti-vibration operation and the floating operation, the amount of leakage in the switching valve 150 can be reduced to a small amount compared to the total amount of leakages.

In addition, the number of components in the switching valve 150 can be reduced compared to the case where the switching valve for switching the anti-vibration operation and the switching valve for switching the floating operation are configured separately.

Figure 7A:
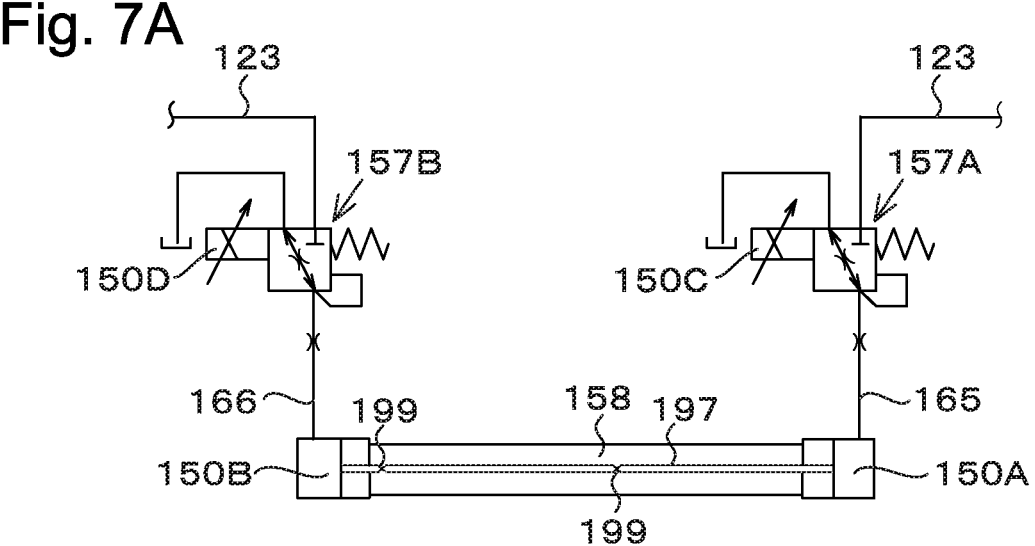
FIG. 7A is a view showing an example in which a connection fluid passage is disposed in a spool.

FIG. 7A is a view showing an interior portion of the switching valve 150 in a hydraulic circuit. That is, the switching valve 150 shown in FIG. 6 is equivalent to the switching valve 150 shown in FIG. 7A. As shown in FIG. 7A, the pilot-supplying passage 123 is connected to a first solenoid valve 157A including the first solenoid 150C and to a second solenoid 157B including the second solenoid 150D. The first solenoid valve 157A and the pressure-receiving portion 150A are connected by a first internal fluid passage 165, and the second solenoid valve 157B and the pressure-receiving portion 150B are connected by a second internal fluid passage 166. FIG. 7A schematically shows the spool 158.

As shown in FIG. 7A, in the spool 158, the pressure-receiving portion 150A of the spool 158 and the pressure-receiving portion 150B of the spool 158 are connected by a connection fluid passage 197. In an intermediate portion of the connection fluid passage 197, a restrictor 199 with a small inner diameter is formed. A plurality of restrictors 199 may be disposed in the connection fluid passage 197, may be disposed in an asymmetrical arrangement, and are not limited to those configurations.

Figure 7B:
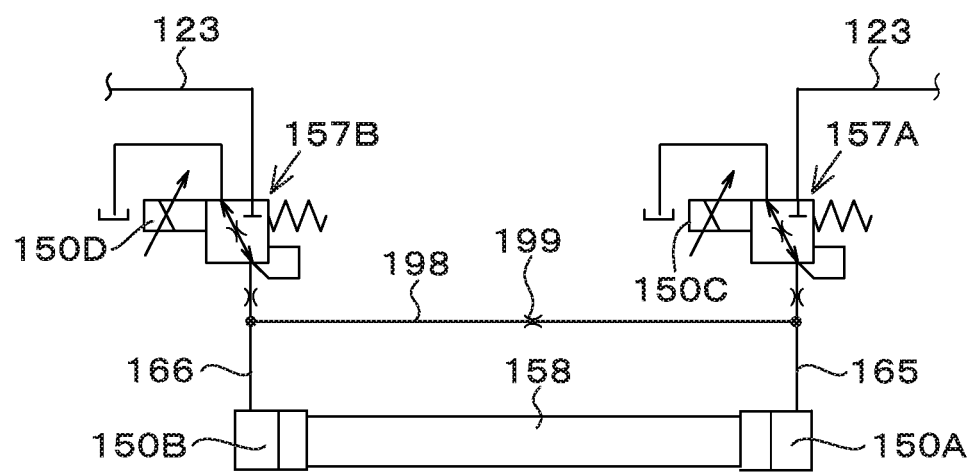
FIG. 7B is a view showing an example in which the connection fluid passage is disposed at a position other than the spool.

As shown in FIG. 7B, the first internal fluid passage 165 and the second internal fluid passage 166 may be connected to each other by a connection fluid passage 198.

According to the third embodiment described above, in the switching valve 150, since the pressure-receiving portion 150A disposed on one side of the switching valve 150 and the pressure-receiving portion 150B disposed on the other side of the switching valve 150 are connected to each other by the connection fluid passages 197 and 198, a shock caused when the spool 158 (switching valve 150) is actuated can be mitigated, thereby improving operability. In other words, a movement speed (stroke speed) of the spool 158 can be reduced, thereby improving the operability.

The working machine 1 includes the machine body 2, the first traveling device (left traveling device) 5L provided on a left portion of the machine body 2, the second traveling device (right traveling device) 5R provided on a right portion of the machine body 2, the left traveling motor 36L configured to output power to the first traveling device 5L, the right traveling motor 36R configured to output power to the right traveling device 5R, the left traveling pump 53L, including the first pressure-receiving portion 53a and the second pressure-receiving portion 53b, configured to normally rotate the left traveling motor 36L when operation fluid is applied to the first pressure-receiving portion 53a, and reversely rotate the left traveling motor 36L when operation fluid is applied to the second pressure-receiving portion 53b, the right traveling pump 53R, including the third pressure-receiving portion 53a and the fourth pressure-receiving portion 53b, configured to normally rotate the right traveling motor 36R when operation fluid is applied to the third pressure-receiving portion 53a, and reversely rotate the right traveling motor 36R when operation fluid is applied to the fourth pressure-receiving portion 53b, the traveling operation device 54 configured to apply the operation fluid to at least any one of the first, second, third and fourth pressure-receiving portions 53a and 53b according to operation of the traveling operation member 54, the first traveling fluid passage 45a fluidly connected to the first pressure-receiving portion 53a and configured so that the operation fluid to be applied to the first pressure-receiving portion 53a flows through the first traveling fluid passage 45a when the traveling operation member 59 is operated, the second traveling fluid passage 45b fluidly connected to the second pressure-receiving portion 53b and configured so that the operation fluid to be applied to the second pressure-receiving portion 53b flows through the second traveling fluid passage 45b when the traveling operation member 59 is operated, the third traveling fluid passage 45c fluidly connected to the third pressure-receiving portion 53a and configured so that the operation fluid to be applied to the third pressure-receiving portion 53a flows through the third traveling fluid passage 45c when the traveling operation member 59 is operated, the fourth traveling fluid passage 45d fluidly connected to the fourth pressure-receiving portion 53b and configured so that the operation fluid to be applied to the fourth pressure-receiving portion 53b flows through the fourth traveling fluid passage 45d when the traveling operation member 59 is operated, and the connection fluid passage 100 fluidly connecting at least two of the first, second, third and fourth pressure-receiving portions 53a and 53b to each other. According to this configuration, for example, among the first traveling fluid passage 45a, the second traveling fluid passage 45b, the third traveling fluid passage 45c, and the fourth traveling fluid passage 45d, the operation fluid flows through the connection fluid passage 100 from the traveling fluid passage on one side with a higher pressure to the traveling fluid passage on the other side with a lower pressure, thereby improving the operability of the traveling operation when the traveling operation member 59 is operated.

The connection fluid passage 100 fluidly connects either one of the first and third traveling fluid passages 45a and 45c and either one of the second and fourth traveling fluid passages 45b and 45d to each other. According to this configuration, in the traveling fluid passage 45, the respective pressure-receiving portions (first pressure-receiving portion and third pressure-receiving portion) 53a on the sides of the left traveling pump 53L and the right traveling pump 53R for normal rotation of the left and right traveling motors 36L and 36R are connected to the respective pressure-receiving portions (second pressure-receiving portion and fourth pressure-receiving portion) 53b on the sides of the left and right traveling pumps 53L and 53R for reverse rotation of the left and right traveling motors 36L and 36R. For example, when making the pivot turn to the left in the forward traveling, the operation fluid (pilot fluid) is supplied from the second traveling fluid passage 45b to the third traveling fluid passage 45c via the connection fluid passage 100. The faster the rotation speed before turning becomes, the more the pilot fluid is supplied to the third traveling fluid passage 45c via the connection fluid passage 100, and accordingly the pressure on the second pressure-receiving portion 53b of the left traveling pump 53L becomes high, thereby improving an operation feeling.

In addition, when the working machine 1 is traveling forward, the pilot pressure applied to the pressure-receiving portions of the traveling pumps (left traveling pump 53L and right traveling pump 53R) becomes low because the operation fluid flows from both the first traveling fluid passage 45a and the third traveling fluid passage 45c to the second traveling fluid passage 45b and the fourth traveling fluid passage 45d through the connection fluid passage 100. On the other hand, for example, in the case of performing the pivot-turn to the left, the pilot pressure of the second traveling fluid passage 45b is increased, and thus the pilot fluid becomes hard to flow from the third traveling fluid passage 45c toward the connection fluid passage 100, so the pilot pressure of the third traveling fluid passage 45c tends to be increased when the traveling operation member 59 is operated (the pressure applied to the third pressure-receiving portion 53a on the side of the right traveling pump 53R for normal rotation of the right traveling motor 36R becomes high). In this manner, it is possible to suppress reduction in the rotation speed of the traveling motor on the outside of the turning in the pivot turn, thereby improving a traveling performance.

The connection fluid passage 100 includes the first connection passage 100a that fluidly connects the first traveling fluid passage 45a and the fourth traveling fluid passage 45d to each other, and the second connection passage 100b that fluidly connects the second traveling fluid passage 45b and the third traveling fluid passage 45c to each other. According to this configuration, the operability of the working machine 1 can be improved with a simple configuration.

The working machine 1 further includes the actuation valve 69 configured to supply operation fluid to the traveling operation device 54, and change a pressure of the operation fluid supplied therefrom to the traveling operation device 54, and the first fluid passage 40a fluidly connecting the traveling operation device 54 to the actuation valve 69. According to this configuration, in a case of suppressing the engine stalling with the actuation valve 69, the operation fluid of the traveling fluid passage 45 can be drained through the connection fluid passage 100, so that the pilot pressure of the traveling fluid passage 45 can be quickly reduced, and accordingly the responsiveness of the traveling pumps (left and right traveling pumps 53L and 53R) can be improved.

The working machine 1 further includes the second fluid passage 110 fluidly connecting the first and third traveling fluid passages 45a and 45c to the first fluid passage 40a. According to this configuration, the operation fluids (pilot fluids) of the traveling fluid passages 45 (first traveling fluid passage 45a, second traveling fluid passage 45b, third traveling fluid passage 45c, and fourth traveling fluid passage 45d) can be drained to the actuation valve 69 side via the second fluid passage 110, and in a case of suppressing the engine stalling with the actuation valve 69, the pilot pressures of the traveling fluid passages 45 can be quickly reduced, and accordingly the responsiveness of the traveling pumps (left and right traveling pumps 53L and 53R) can be improved.

The working machine 1 further includes the restrictor 101 provided on the connection fluid passage 100. According to this configuration, a pressure fluctuation of the pilot fluid in the traveling fluid passages 45 (first traveling fluid passage 45a, second traveling fluid passage 45b, third traveling fluid passage 45c, fourth traveling fluid passage 45d) can be stabilized.

Fourth Embodiment

Figure 8:
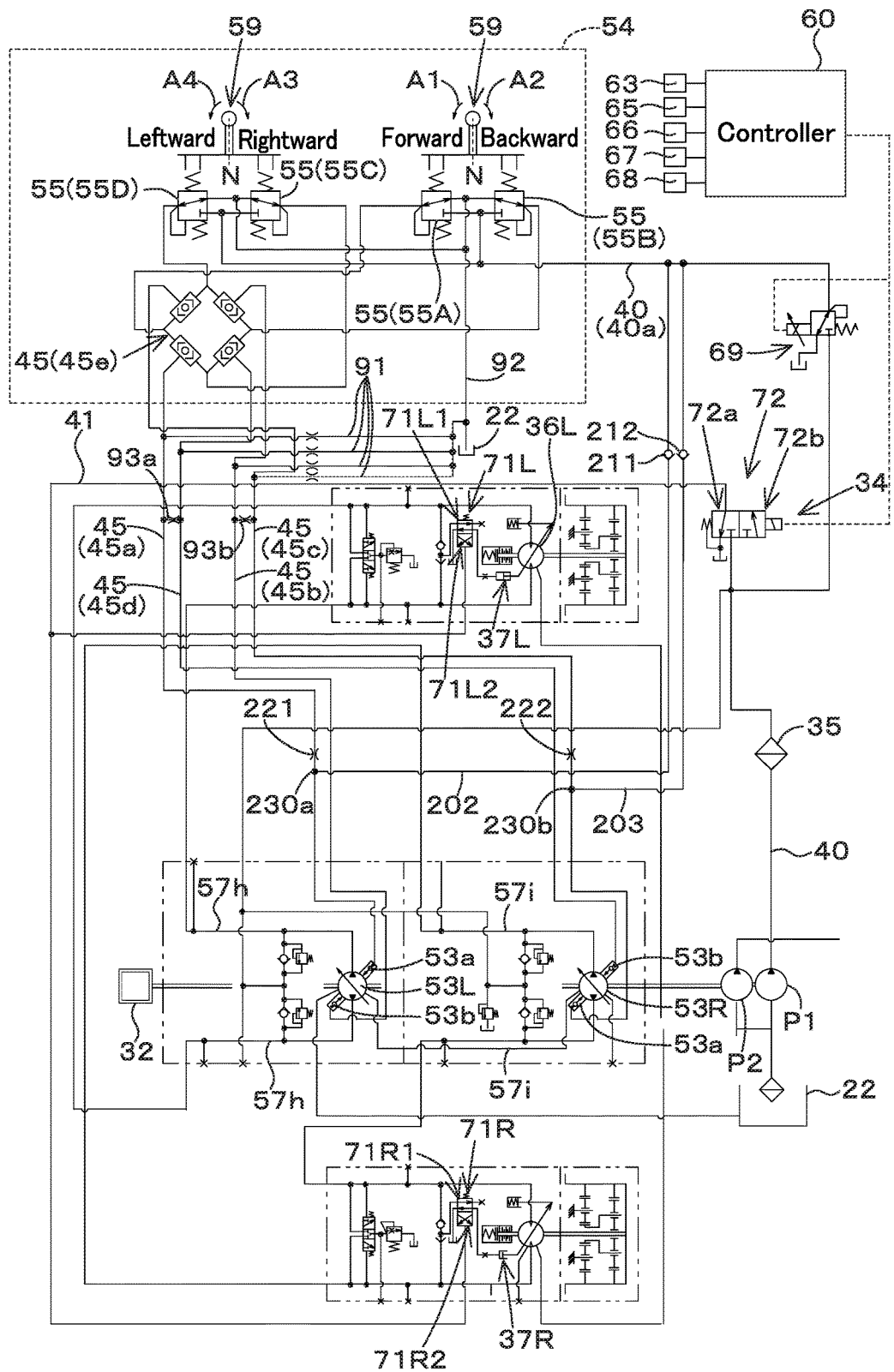
FIG. 8 is a view showing a hydraulic system (hydraulic circuit) for a working machine according to a fourth embodiment.

FIG. 8 is a view showing a hydraulic system for a working machine according to a fourth embodiment.

As shown in FIG. 8, the first traveling fluid passage 45a and the fourth traveling fluid passage 45d are connected to each other by a connection fluid passage 93a, and the second traveling fluid passage 45b and the third traveling fluid passage 45c are connected to each other by a connection fluid passage 93b.

The controller 60 is connected to the accelerator 65, a mode switch 66, a speed-shifting switch 67, and a rotation detection device 68.

The mode switch 66 is a switch that enables or disables the automatic deceleration. For example, the mode switch 66 is an on/off switch configured so that, when the mode switch 66 is turned on, the automatic deceleration is enabled, and the mode switch 66 is turned off, the automatic deceleration is disabled.

The speed-shifting switch 67 is disposed in the vicinity of the driver's seat 8 so that it can be operated by a driver (operator). The speed-shifting switch 67 is a switch that can manually switch the traveling motors (left traveling motor 36L and right traveling motor 36R) to either the first speed or the second speed. For example, the speed-shifting switch 67 is a seesaw switch that is switchable between the first speed side and the second speed side, and can be used for an accelerating operation to shift the speed from the first speed to the second speed and for a decelerating operation to shift the speed from the second speed to the first speed.

The rotation detection device 68 is constituted of a sensor or the like that detects the rotation speed and is configured to detect a prime mover rotation speed, which is the rotation speed of the prime mover 32.

The controller 60 performs an automatic deceleration control when the automatic deceleration is enabled, and does not perform the automatic deceleration control when the automatic deceleration is disabled.

In the automatic deceleration control, when a predetermined condition (an automatic deceleration condition) is satisfied in a case where the traveling motors (left traveling motor 36L and right traveling motor 36R) are set in rotation speed at the second speed, the traveling motors (left traveling motor 36L and right traveling motor 36R) are automatically shifted from the second speed to the first speed. In the automatic deceleration control, when the automatic deceleration condition is satisfied at least in a state where the traveling motors (left traveling motor 36L and right traveling motor 36R) are at the second speed, the controller 60 shifts the second switching valve 72 from the second position 72b to the first position 72a by demagnetizing a solenoid of the second switching valve 72. In this manner, the traveling motors (left traveling motor 36L and right traveling motor 36R) are decelerated from the second speed to the first speed. That is, in the automatic deceleration control, the controller 60 decelerates both the left traveling motor 36L and the right traveling motor 36R from the second speed to the first speed when the automatic deceleration is performed.

After performing the automatic deceleration, when a recovering condition is satisfied, the controller 60 accelerates the traveling motors (left traveling motor 36L and right traveling motor 36R) from the first speed to the second speed by switching the second switching valve 72 from the first position 72a to the second position 72b according to magnetization of the solenoid of the second switching valve 72, that is, the rotation speeds of the traveling motors are recovered. That is, when recovering from the first speed to the second speed, the controller 60 accelerates the rotation speeds of both the left traveling motor 36L and the right traveling motor 36R from the first speed to the second speed.

When the automatic deceleration is disabled, the controller 60 performs a manually shifting control to shift the traveling motors (left traveling motor 36L and right traveling motor 36R) to either the first speed or the second speed according to an operation of the speed switching switch 67. In the manually shifting control, when the speed-shifting switch 67 is switched to the first speed side, the solenoid of the second switching valve 72 is demagnetized to shift the traveling motors (left traveling motor 36L and right traveling motor 36R) to the first speed. In addition, in the manually shifting control, when the speed-shifting switch 67 is switched to the second speed side, the traveling motors (left traveling motor 36L and right traveling motor 36R) are shifted to the second speed by demagnetizing the solenoid of the second switching valve 72.

The controller 60 performs a control to prevent the engine stalling (anti-stall control) when a heavy load is applied on the prime mover 32. That is, the controller 60 performs the anti-stall control according to the load on the prime mover 32.

For example, when a dropping amount, which is a difference between the target rotation speed determined by the accelerator 65 and the actual rotation speed detected by the rotation detection device 68, is not less than a threshold value, the controller 60 performs the anti-stall control because it means that a heavy load is applied on the prime mover 32. In the anti-stall control, the outputs of the traveling pumps (left and right traveling pumps 53L and 53R) are reduced by reducing the opening degree of the actuation valve 69 shown in FIG. 8.

As shown in FIG. 8, the actuation valve 69 is a valve that can change the pilot pressure of the pilot fluid operating the traveling pumps (left and right traveling pumps 53L and 53R). The actuation valve 69 and the traveling operation device 54 are connected to each other by the first fluid passage 40a. In detail, the actuation valve 69 is disposed in an intermediate portion of the delivery fluid passage 40, and a section in the delivery fluid passage 40 that connects the actuation valve 69 to the traveling operation device 54 is the first fluid passage 40a.

The actuation valve 69 changes the opening degree thereof to change the pilot pressure (operation pilot pressures applied to the pressure-receiving portions 53a and 53b) of the pilot fluid that operates the traveling pumps (left and right traveling pumps 53L and 53R). For example, the actuation valve 69 is an electromagnetic proportional valve whose opening degree can be changed based on the control signal (e.g., voltage, electric current) of the controller 60. The actuation valve 69 is configured so that an opening degree thereof increases as a value of the control signal (control value) increases, and the opening degree decreases as the control value decreases.

The controller 60 outputs the control signal to the actuation valve 69 to magnetize a solenoid of the valve 69, thereby changing the pilot pressure (traveling primary pressure) applied from the valve 69 toward the traveling control unit 54. In this manner, the pilot pressure to operate the traveling pumps (left and right traveling pumps 53L and 53R) are changed.

In the control map shown in FIG. 4, since the traveling primary pressure is determined corresponding to the opening degree of the actuation valve 69, there is a correlation between the traveling primary pressure and a magnitude of the control signal to be output to the actuation valve 69, and thus the traveling primary pressure can be replaced by the control signal. That is, the traveling primary pressure on the vertical axis of the control map can be read as the control signal. The control map is stored in the storage unit 63.

The controller 60 calculates the dropping amount, which is a difference between the target rotation speed defined by the accelerator 65 and the actual rotation speed detected by the rotation detection device 68. When the dropping amount is less than a threshold value, the controller 60 determines a control value indicated by the control signal according to the rotation speed of the prime mover (target rotation speed or actual rotation speed) so as to match the line L1 of the control map.

On the other hand, when the dropping amount is not less than the threshold value, the controller 60 determines the control value indicated by the control signal according to the rotation speed of the prime mover (target rotation speed or actual rotation speed) so as to match the line L2 of the control map. That is, the controller 60 determines the control value such as the current value or the voltage value based on the control map.

Accordingly, in the anti-stall control, the pilot pressure (traveling primary pressure) of the operation fluid entering the operation valves 55 can be kept low by determining the control value based on the line L2 and outputting the control signal indicating the control value to the operation valve 69. As a result, the swash plate angles of the traveling pumps (left and right traveling pumps 53L and 53R) are adjusted, a load applied to the prime mover 32 is reduced, thereby preventing the engine stalling. In FIG. 4, a single of line L2 is shown, but there may be multiple lines L2.

As shown in FIG. 8, the hydraulic system for the working machine includes a circuit to improve responsiveness of the actuation valve 69 when the actuation valve 69 is actuated. Specifically, a second fluid passage 202 and a third fluid passage 203 are connected to the first fluid passage 40a on an output side of the actuation valve 69. The second fluid passage 202 is a fluid passage that connects the first fluid passage 40a to the first traveling fluid passage 45a. The third fluid passage 203 is a fluid passage that connects the first fluid passage 40a to the third traveling fluid passage 45c.

A first check valve 211 is disposed on an intermediate portion of the second fluid passage 202. The first check valve 211 is a valve that allows the operation fluid to flow from the first traveling fluid passage 45a to the first fluid passage 40a and prevents the operation fluid from flowing from the first fluid passage 40a to the first traveling fluid passage 45a.

A second check valve 212 is disposed on an intermediate portion of the third fluid passage 203. The second check valve 212 is a valve that allows the operation fluid to flow from the third traveling fluid passage 45c to the first fluid passage 40a and prevents the operation fluid from flowing from the first fluid passage 40a to the third traveling fluid passage 45c.

In addition, a first restrictor 221 is disposed on the first traveling fluid passage 45a to which the second fluid passage 202 is connected, and a second restrictor 222 is disposed on the third traveling fluid passage 45c to which the third fluid passage 203 is connected.

The first restrictor 221 is disposed on the first traveling fluid passage 45a and on an opposite side of a first joint 230a between the first traveling fluid passage 45a and the second fluid passage 202 from the left traveling pump 53L. That is, the first restrictor 221 is disposed on a portion of the first traveling fluid passage 45a closer to the operation device 54 than the first joint 230a.

A second restrictor 222 is disposed on the third traveling fluid passage 45c and on an opposite side of a second joint 230b between the third traveling fluid passage 45c and the second fluid passage 202 from the right traveling pump 53R. That is, the second restrictor 222 is disposed on a portion of the third fluid passage 45c closer to the operation device 54 than the second connection portion 230b.

According to the above configuration, when the opening degree of the actuation valve 69 is reduced in the anti-stall control, the operation fluid of the first traveling fluid passage 45a flows through the second fluid passage 202 and flows to the drain side of the actuation valve 69, thereby improving responsiveness of the left traveling pump 53L during the normal rotation of the left traveling motor 36L. In addition, when the opening degree of the actuation valve 69 is reduced in the anti-stall control, the operation fluid of the third traveling fluid passage 45c flows through the third fluid passage 203 and flows to the drain side of the actuation valve 69, thereby improving responsiveness of the right traveling pump 53R during the normal rotation of the right traveling motor 36R. In other words, since the second traveling fluid passage 45b and the fourth traveling fluid passage 45d, through which the operation fluid flows so as to cause the left traveling pump 53L and the right traveling pump 53R to reversely rotate the left traveling motor 36L and the right traveling motor 36R, are configured so that the operation fluid does not flow to the drain side of the operation valve 69, the responsiveness to prevent the engine stalling specifically during the forward traveling of the working machine 1 can be improved.

Figure 9:
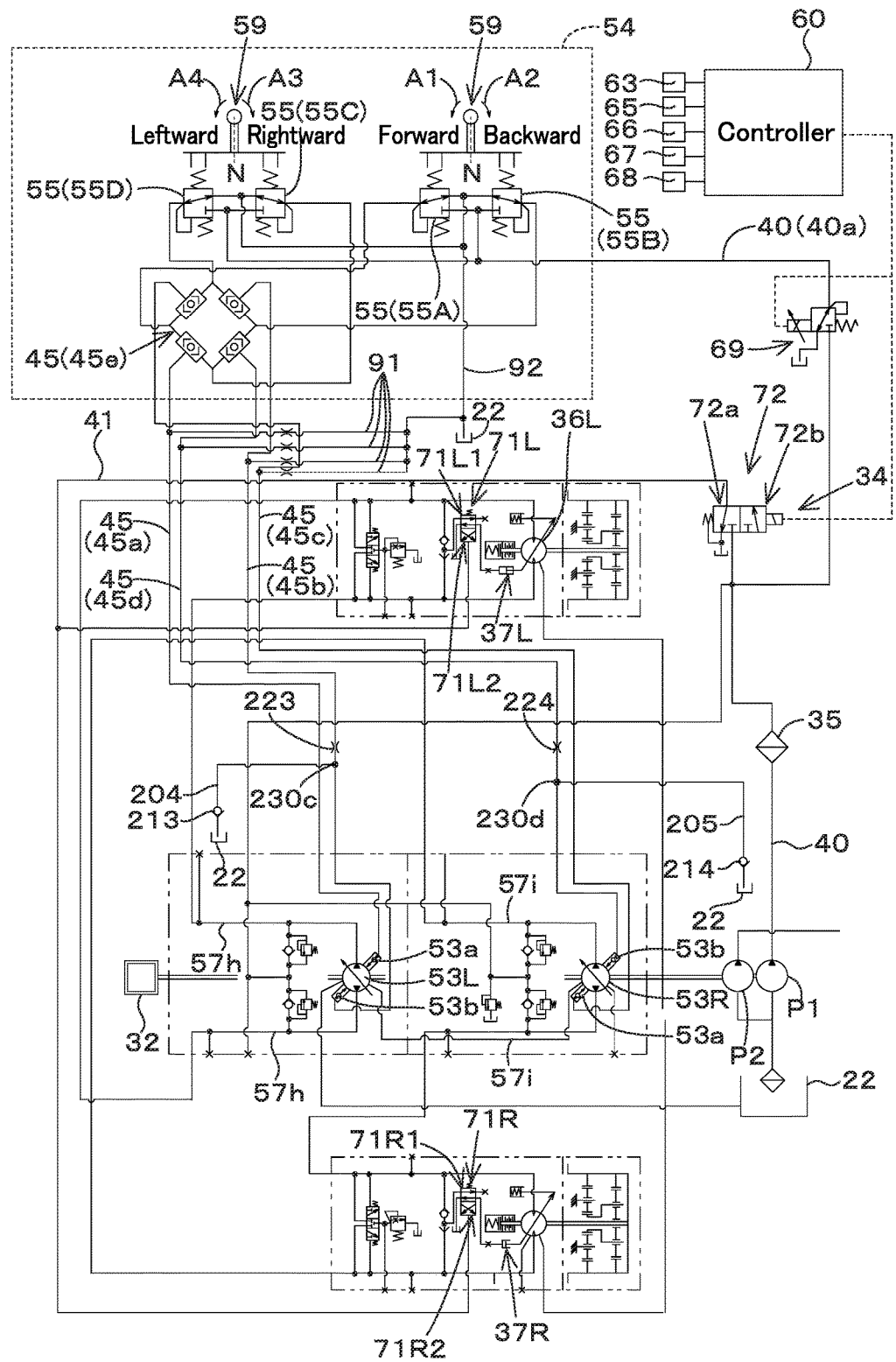
FIG. 9 is a view showing a modified example of the hydraulic system (hydraulic circuit) for the working machine.

FIG. 9 shows a modified example of the hydraulic system for the working machine.

FIG. 9 also shows a circuit that improves responsiveness of the actuation valve 69 when the actuation valve 69 is actuated. As shown in FIG. 9, the hydraulic system for the working machine includes a fourth fluid circuit 204 and a fifth fluid circuit 205.

The fourth fluid passage 204 is a fluid passage that connects the second traveling fluid passage 45b to a drainage such as the operation fluid tank 22, which is a draining destination of the operation fluid. The fifth fluid passage 205 is a fluid passage that connects the drainage to the fourth traveling fluid passage 45d.

A third check valve 213 is disposed on an intermediate portion of the fourth fluid passage 204. The third check valve 213 is a valve that prevents the operation fluid from flowing from the second traveling fluid passage 45b to the drainage and allows the operation fluid to flow from the drainage to the second traveling fluid passage 45b.

A fourth check valve 214 is disposed on an intermediate portion of the fifth fluid passage 205. The fourth check valve 214 is a valve that prevents the operation fluid from flowing from the fourth traveling fluid path 45d toward the drainage and allows the operation fluid to flow from the drainage toward the fourth traveling fluid path 45d.

In addition, a third restrictor 223 is disposed in the second traveling fluid passage 45b to which the fourth fluid passage 204 is connected, and a fourth restrictor 224 is disposed in the fourth traveling fluid passage 45d to which the fifth fluid passage 205 is connected.

The third restrictor 223 is disposed on the second traveling fluid passage 45b and on an opposite side of a third joint 230c between the second traveling fluid passage 45b and the fourth fluid passage 204 from the left traveling pump 53L. That is, the third restrictor 223 is disposed on a portion of the second traveling fluid passage 45b closer to the operation device 54 than the third joint 230c.

A fourth restrictor 224 is disposed on the fourth traveling fluid passage 45d and on an opposite side of a fourth joint 230d between the fourth traveling fluid passage 45d and the fifth fluid passage 205 from the right traveling pump 53R. That is, the fourth restrictor 224 is disposed on a portion of the fourth traveling fluid passage 45d closer to the operation device 54 than the fourth joint 230d.

According to the above configuration, when the opening degree of the actuation valve 69 is reduced in the anti-stall control in a case where the operation fluid is applied to the pressure-receiving portion 53a of the left traveling pump 53L (in a case where the operation fluid is applied to the pressure-receiving portion 53a on the side of the left traveling pump 53L for normal rotation of the left traveling motor 36L), a pressure of the operation fluid applied to the pressure-receiving portion 53a of the left traveling pump 53L causes a servo piston to move from the side for reverse rotation of the left traveling motor 36L (pressure-receiving portion 53b side) toward the neutral position. Since the fourth fluid passage 204 connected to the drainage is connected to the second traveling fluid passage 45b connected to the pressure receiving section 53b that receives a pressure of the operation fluid on the side of the left traveling pump 53L for reverse rotation of the left traveling motor 36L, the servo piston can reduce a negative pressure in the second traveling fluid passage 45b by moving toward the neutral position.

Similarly, when the opening degree of the actuation valve 69 is reduced in the anti-stall control in a case where the operation fluid is applied to the pressure-receiving portion 53a of the right traveling pump 53R (in a case where the operation fluid is applied to the pressure-receiving portion 53a on the side of the right traveling pump 53R for normal rotation of the right traveling motor 36R), a pressure of the operation fluid applied to the pressure-receiving portion 53a of the right traveling pump 53R causes the servo piston to move from the side for reverse rotation of the right traveling motor 36R (pressure-receiving portion 53b side) toward the neutral position. Since the fifth fluid passage 205 connected to the drainage is connected to the fourth traveling fluid passage 45d connected to the pressure receiving section 53b that receives a pressure of the operation fluid on the side of the right traveling pump 53R for reverse rotation of the right traveling motor 36R, the servo piston can move toward the neutral position to reduce a negative pressure in the fourth traveling fluid passage 45d.

As described above, in the modified example shown in FIG. 9, when the opening degree of the actuation valve 69 is reduced in the anti-stall control, it is suppressed that the second traveling fluid passage 45b and the fourth traveling fluid passage 45d generate negative pressures, thereby improving responsiveness of the left traveling pump 53L and the right traveling pump 53R.

In the above-described embodiment, the drainage is the operation fluid tank 22. Alternatively, the drainage, to which the operation fluid is drained, may be other than the operation fluid tank 22, and is not limited thereto. For example, the drainage may be a suction portion of the hydraulic pump P1 from which the operation fluid is sucked into the hydraulic pump P1, or may be another portion.

The working machine 1 includes the machine body 2, the left traveling device 5L provided on a left portion of the machine body 2, The right traveling device 5R provided on a right portion of the machine body 2, the left traveling motor 36L configured to output power to the left traveling device 5L, the right traveling motor 36R configured to output power to the right traveling device 5R, the left traveling pump 53L, including the first pressure-receiving portion 53a and the second pressure-receiving portion 53b, configured to normally rotate the left traveling motor 36L when operation fluid is applied to the first pressure-receiving portion 53a, and reversely rotate the left traveling motor 36L when operation fluid is applied to the second pressure-receiving portion 36b, the right traveling pump 53R, including the third pressure-receiving portion 53a and the fourth pressure-receiving portion 53b, configured to normally rotate the right traveling motor 36R when operation fluid is applied to the third pressure-receiving portion 53a, and reversely rotate the right traveling motor 36R when operation fluid is applied to the fourth pressure-receiving portion 53b, the traveling operation device 54 configured to apply the operation fluid to at least any one of the first, second, third and fourth pressure-receiving portions 53a, 36b and 53b according to operation of the traveling operation member 59, the actuation valve 69 configured to supply operation fluid to the traveling operation device 54, and change a pressure of the operation fluid supplied therefrom to the traveling operation device 54, the first fluid passage 40a fluidly connecting the traveling operation device 54 to the actuation valve 69, the first traveling fluid passage 45a fluidly connected to the first pressure-receiving portion 53a and configured so that the operation fluid to be applied to the first pressure-receiving portion 53a flows through the first traveling fluid passage 45a when the traveling operation member 59 is operated, the second traveling fluid passage 45b fluidly connected to the second pressure-receiving portion 36b and configured so that the operation fluid to be applied to the second pressure-receiving portion 36b flows through the second traveling fluid passage 45b when the traveling operation member 59 is operated, the third traveling fluid passage 45c fluidly connected to the third pressure-receiving portion 53a and configured so that the operation fluid to be applied to the third pressure-receiving portion 53a flows through the third traveling fluid passage 45c when the traveling operation member 59 is operated, the fourth traveling fluid passage 45d fluidly connected to the fourth pressure-receiving portion 53b and configured so that the operation fluid to be applied to the fourth pressure-receiving portion 53b flows through the fourth traveling fluid passage 45d when the traveling operation member 59 is operated, the second fluid passage 202 fluidly connecting the first fluid passage 40a to the first traveling fluid passage 45a, and the third fluid passage 203 fluidly connecting the first fluid passage 40a to the third traveling fluid passage 45c.

According to this configuration, the second fluid passage 202 and the third fluid passage 203 are connected to the first traveling fluid passage 45a and the third traveling fluid passage 45c through which the operation fluid flows so as to cause the left traveling pump 53L and the right traveling pump 53R to normally rotate the left traveling motor 36L and the right traveling motor 36R. Accordingly, when the actuation valve 69 is actuated during the normal rotations of the left traveling motor 36L and the right traveling motor 36R, the operation fluid in the first traveling fluid passage 45a and the third traveling fluid passage 45c can be drained from the actuation valve 69 through the second fluid passage 202 and the third fluid passage 203. And, pressures of the operation fluids applied to the left traveling pump 53L and the right traveling pump 53R can be quickly reduced during the normal rotations of the left traveling motor 36L and the right traveling motor 36R. In this manner, the responsiveness in the left and right traveling pumps 53L and 53R when normally rotating the left and right traveling motors 36L and 36R can be improved.

The working machine 1 further includes the first check valve 211 provided on the second fluid passage 202 and configured to allow the operation fluid to flow from the first traveling fluid passage 45a to the first fluid passage 40a, and prevent the operation fluid from flowing from the first fluid passage 40a to the first traveling fluid passage 45a, and the second check valve 212 provided on the third fluid passage 203 and configured to allow the operation fluid to flow from the third traveling fluid passage 45c to the first fluid passage 40a, and prevent the operation fluid from flowing from the first fluid passage 40a to the third traveling fluid passage 45c. According to this configuration, pressures of the operation fluids can be stably applied to the left traveling pump 53L and the right traveling pump 53R while the circuit configuration allows the first traveling fluid passage 45a and the third traveling fluid passage 45c to drain the operation fluid to the second fluid passage 202 and the third fluid passage 203.

The working machine 1 further includes the first restrictor 221 provided on the first traveling fluid passage 45a and on an opposite side of the first joint 230a between the first traveling fluid passage 45a and the second fluid passage 202 from the left traveling pump 53L, and the second restrictor 222 provided on the third traveling fluid passage 45c and on an opposite side of the second joint 230b between the third traveling fluid passage 45c and the second fluid passage 202 from the right traveling pump 53R.

According to this configuration, pressures of the operation fluids can be stably applied to the left traveling pump 53L and the right traveling pump 53R while the circuit configuration allows the first traveling fluid passage 45a and the third traveling fluid passage 45c to drain the operation fluid to the second fluid passage 202 and the third fluid passage 203.

The working machine 1 includes the drainage configured to drain the operation fluid, the fourth fluid passage 204 fluidly connecting the drainage to the first traveling fluid passage 45a, and the fifth fluid passage 205 fluidly connecting the drainage to the third traveling fluid passage 45c.

According to this configuration, the fourth fluid passage 204 and the fifth fluid passage 205 are connected to the second traveling fluid passage 45b and the fourth traveling fluid passage 45d through which the operation fluid flows so as to cause the left traveling pump 53L and the right traveling pump 53R to normally rotate the left traveling motor 36L and the right traveling motor 36R. Accordingly, it is suppressed that the second traveling fluid passage 45b and the fourth traveling fluid passage 45d generate negative pressures through the fourth fluid passage 204 and the fifth fluid passage 205 when the actuation valve 69 is actuated during the normal rotations of the left traveling motor 36L and the right traveling motor 36R. And, pressures of the operation fluids applied to the left traveling pump 53L and the right traveling pump 53R can be quickly reduced during the normal rotations of the left traveling motor 36L and the right traveling motor 36R. In this manner, the responsiveness in the left and right traveling pumps 53L and 53R when normally rotating the left and right traveling motors 36L and 36R can be improved.

The working machine 1 further includes the third check valve 213 provided on the fourth fluid passage 204 and configured to prevent the operation fluid from flowing from the first traveling fluid passage 45a to the drainage, and allow the operation fluid to flow from the drainage to the first traveling fluid passage 45a, and the fourth check valve 214 provided on the fifth fluid passage 205 and configured to prevent the operation fluid from flowing from the third traveling fluid passage 45c to the drainage, and prevent the operation fluid from flowing from the drainage to the third traveling fluid passage 45c. According to this configuration, pressures of the operation fluids can be stably applied to the left traveling pump 53L and the right traveling pump 53R while the circuit configuration allows the second traveling fluid passage 45b and the fourth traveling fluid passage 45d to be connected to the fourth fluid passage 204 and the fifth fluid passage 205.

The working machine 1 further includes the third restrictor 223 provided on the second traveling fluid passage 45b and on an opposite side of the third joint 230c between the second traveling fluid passage 45b and the fourth fluid passage 204 from the left traveling pump 53L, and the fourth restrictor 224 provided on the fourth traveling fluid passage 45d and on an opposite side of the fourth joint 230d between the fourth traveling fluid passage 45d and the fourth fluid passage 204 from the right traveling pump 53R. According to this configuration, pressures of the operation fluids can be stably applied to the left traveling pump 53L and the right traveling pump 53R while the circuit configuration allows the second traveling fluid passage 45b and the fourth traveling fluid passage 45d to be connected to the fourth fluid passage 204 and the fifth fluid passage 205.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine comprising:
   a machine body;
   a left traveling device provided on a left portion of the machine body;
   a right traveling device provided on a right portion of the machine body;
   a left traveling motor configured to output power to the left traveling device;
   a right traveling motor configured to output power to the right traveling device;
   a left traveling pump, including a first pressure-receiving portion and a second pressure-receiving portion, configured to
      normally rotate the left traveling motor when operation fluid is applied to the first pressure-receiving portion, and
      reversely rotate the left traveling motor when operation fluid is applied to the second pressure-receiving portion;
   a right traveling pump, including a third pressure-receiving portion and a fourth pressure-receiving portion, configured to
      normally rotate the right traveling motor when operation fluid is applied to the third pressure-receiving portion, and
      reversely rotate the right traveling motor when operation fluid is applied to the fourth pressure-receiving portion;
   a traveling operation device, including a traveling operation member and a plurality of operation valves actuated according to operation of the traveling operation member, configured to apply the operation fluid to at least any one of the first, second, third and fourth pressure-receiving portions according to operation of the traveling operation member;
   a first traveling fluid passage fluidly connecting an output port of a first high-pressure selector valve to the first pressure-receiving portion and configured so that the operation fluid to be applied to the first pressure-receiving portion flows through the first traveling fluid passage when the traveling operation member is operated;
   a second traveling fluid passage fluidly connecting an output port of a second high-pressure selector valve to the second pressure-receiving portion and configured so that the operation fluid to be applied to the second pressure-receiving portion flows through the second traveling fluid passage when the traveling operation member is operated;
   a third traveling fluid passage fluidly connecting an output port of a third high-pressure selector valve to the third pressure-receiving portion and configured so that the operation fluid to be applied to the third pressure-receiving portion flows through the third traveling fluid passage when the traveling operation member is operated;
   a fourth traveling fluid passage fluidly connecting an output port of a fourth high-pressure selector valve to the fourth pressure-receiving portion and configured so that the operation fluid to be applied to the fourth pressure-receiving portion flows through the fourth traveling fluid passage when the traveling operation member is operated;

a fifth traveling fluid passage on which the first, second, third and fourth high-pressure selector valves are disposed, the fifth traveling fluid passage connecting the plurality of operation valves, the first, second, third and fourth traveling fluid passages to each other;

first, second, third and fourth drain fluid passages connected to the first, second, third and fourth traveling fluid passages, respectively, and configured so that the operation fluid drains;

a restrictor provided on each of the first, second, third and fourth drain fluid passages; and a connection fluid passage fluidly connecting at least two of the first, second, third and fourth traveling fluid passages directly to each other without utilizing the first, second, third and fourth drain fluid passages.

2. The working machine according to claim 1, wherein the connection fluid passage fluidly connects either one of the first and third traveling fluid passages and either one of the second and fourth traveling fluid passages to each other.

3. The working machine according to claim 2, wherein the connection fluid passage includes a first connection passage that fluidly connects the first traveling fluid passage and the fourth traveling fluid passage to each other, and a second connection passage that fluidly connects the second traveling fluid passage and the third traveling fluid passage to each other.

4. The working machine according to claim 3, further comprising:

a restrictor provided on both the first connection passage and the second connection passage, the restrictor being different from the restrictor provided on each of the first, second, third and fourth drain fluid passages.

5. The working machine according to claim 2, further comprising:

a restrictor provided on the connection fluid passage, the restrictor being different from the restrictor provided on each of the first, second, third and fourth drain fluid passages.

6. The working machine according to claim 1, further comprising:

a restrictor provided on the connection fluid passage, the restrictor being different from the restrictor provided on each of the first, second, third and fourth drain fluid passages.

* * * * *